United States Patent
Akiyama

(10) Patent No.: US 11,399,163 B2
(45) Date of Patent: Jul. 26, 2022

(54) LIGHT SOURCE DEVICE AND PROJECTOR

(71) Applicant: SEIKO EPSON CORPORATION, Tokyo (JP)

(72) Inventor: Koichi Akiyama, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/475,466

(22) Filed: Sep. 15, 2021

(65) Prior Publication Data

US 2022/0086406 A1  Mar. 17, 2022

(30) Foreign Application Priority Data

Sep. 16, 2020 (JP) .............................. JP2020-155686

(51) Int. Cl.
*H04N 9/31* (2006.01)

(52) U.S. Cl.
CPC ......... *H04N 9/3167* (2013.01); *H04N 9/3152* (2013.01); *H04N 9/3158* (2013.01)

(58) Field of Classification Search
CPC .. H04N 9/3167; H04N 9/3152; H04N 9/3158; H04N 9/3164; H04N 9/3197; H04N 9/31; H04N 9/3108; G03B 21/28; G03B 21/2066; G03B 21/208; G03B 21/2013; G03B 21/2033; G03B 21/142; G03B 33/12; G02B 27/283; G02B 27/28
USPC ...... 348/744, 750, 756–760; 353/20, 81, 94, 353/98, 99
See application file for complete search history.

(56) References Cited

U.S. PATENT DOCUMENTS

| | | |
|---|---|---|
| 5,161,042 A | 11/1992 | Hamada |
| 10,915,014 B1 | 2/2021 | Akiyama |
| 2005/0248736 A1 | 11/2005 | Itoh |
| 2008/0062386 A1 | 3/2008 | Ito |
| 2013/0027670 A1 | 1/2013 | Akiyama et al. |
| 2020/0201155 A1 | 6/2020 | Akiyama |
| 2020/0249555 A1 | 8/2020 | Akiyama |
| 2020/0252589 A1 | 8/2020 | Akiyama |
| 2020/0314397 A1 | 10/2020 | Akiyama |

FOREIGN PATENT DOCUMENTS

| | | |
|---|---|---|
| JP | H04-60538 A | 2/1992 |
| JP | 2005-321502 A | 11/2005 |
| JP | 2008-065250 A | 3/2008 |
| JP | 2013-167812 A | 8/2013 |

(Continued)

*Primary Examiner* — Sherrie Hsia
(74) *Attorney, Agent, or Firm* — Oliff PLC

(57) ABSTRACT

A light source device according to the present disclosure includes a first light source section for emitting first light in a first wavelength band, a first polarization split element for transmitting the first light polarized in a first polarization direction and reflecting the first light polarized in a second polarization direction, a second polarization split element for reflecting the first light with the first polarization direction, a diffusion element for diffusing the first light from the first polarization split element, a wavelength conversion element for emitting second light in a second wavelength band, a second light source section for emitting third light in a third wavelength band, a first optical element for reflecting the third light, and a second optical element for separating the second light into fourth light in a fourth wavelength band and a fifth light in the third wavelength band.

17 Claims, 13 Drawing Sheets

(56) References Cited

FOREIGN PATENT DOCUMENTS

| JP | 2014-106453 A | 6/2014 |
|----|---------------|--------|
| JP | 2014-182206 A | 9/2014 |
| JP | 2015-060035 A | 3/2015 |
| JP | 2019-053241 A | 4/2019 |
| JP | 2020-034821 A | 3/2020 |
| JP | 2020-101711 A | 7/2020 |
| JP | 2020-106692 A | 7/2020 |
| JP | 2020-126089 A | 8/2020 |
| JP | 2020-126170 A | 8/2020 |
| JP | 2020-160236 A | 10/2020 |
| JP | 2021-033165 A | 3/2021 |

LIGHT SOURCE DEVICE AND PROJECTOR

The present application is based on, and claims priority from JP Application Serial Number 2020-155686, filed Sep. 16, 2020, the disclosure of which is hereby incorporated by reference herein in its entirety.

BACKGROUND

1. Technical Field

The present disclosure relates to a light source device and a projector.

2. Related Art

There has been known a projector which modulates light emitted from a light source to generate image light based on image information, and then projects the image light thus generated. In JP-A-4-60538 (Document 1), there is disclosed a projection type color image display device provided with a light source, a plurality of dichroic mirrors, a liquid crystal display element having a microlens array, and a projection lens. The projection type color image display device separates the white light emitted from the light source into a plurality of colored light beams having respective colors different from each other, and then makes the colored light beams thus separated from each other enter the respective sub-pixels different from each other in one liquid crystal display element to thereby perform color display.

In the projection type color image display device described above, there are arranged a red reflecting dichroic mirror, a green reflecting dichroic mirror, and a blue reflecting dichroic mirror along the incident light axis of the white light emitted from the light source in a state of being nonparallel to each other. The white light emitted from the light source passes through the dichroic mirrors described above to thereby be separated into red light, green light, and blue light different in proceeding direction from each other. The red light, the green light, and the blue light respectively enter red sub-pixels, green sub-pixels, and blue sub-pixels of the light modulation element in the state of being spatially separated from each other by a microlens disposed at the incidence side of the light modulation element.

In the projection type color image display device in Document 1, a lamp light source such as a halogen lamp or a xenon lamp is adopted as the white light source, and a liquid crystal display element is adopted as the light modulation element. Although the light emitted from the lamp light source is unpolarized light, when using the liquid crystal display element as the light modulation element, the light entering the liquid crystal display element needs to be linearly polarized light having a specific polarization direction. To this end, it is conceivable to dispose a pair of multi-lens arrays for dividing the incident light into a plurality of partial light beams, and a polarization conversion element for uniforming the polarization directions of the plurality of partial light beams between the white light source and the liquid crystal display element as a device for homogenously illuminating the liquid crystal display element. In this case, there is often used a polarization conversion element provided with a plurality of polarization split layers and a plurality of reflecting layers alternately arranged along a direction crossing the incident direction of the light, and a retardation layer disposed in a light path of the light transmitted through the polarization split layers or a light path of the light reflected by the reflecting layers.

However, when reducing the projection type color image display device described above in size in compliance with the recent demand of reduction in size, it is difficult to manufacture the polarization conversion element narrow in pitch between the polarization split layer and the reflecting layer. Therefore, it is difficult to reduce the size of the light source device equipped with this type of polarization conversion element, and by extension, to reduce the size of the projector equipped with the light source device. In view of such a problem, it is required to provide a light source device capable of emitting a plurality of colored light beams uniformed in polarization direction without using the polarization conversion element narrow in pitch.

SUMMARY

In view of the problems described above, according to one aspect of the present disclosure, there is provided a light source device including a first light source section configured to emit a first light beam which has a first wavelength band and includes light polarized in a first polarization direction and light polarized in a second polarization direction different from the first polarization direction, a first polarization split element configured to transmit the first light beam entering the first polarization split element from the first light source section along a first direction and polarized in the first polarization direction toward the first direction, and configured to reflect the first light beam polarized in the second polarization direction toward a second direction crossing the first direction, a second polarization split element disposed at the first direction side of the first polarization split element, and configured to reflect the first light beam which enters the second polarization split element along the first direction from the first polarization split element, and is polarized in the first polarization direction toward the second direction, a diffusion element configured to diffuse the first light beam entering the diffusion element along the second direction from the first polarization split element, and configured to emit the first light beam diffused toward a third direction as an opposite direction to the second direction, a wavelength conversion element disposed at the second direction side of the second polarization split element, configured to perform wavelength conversion on the first light beam which enters the wavelength conversion element along the second direction from the second polarization split element, and is polarized in the first polarization direction, and configured to emit a second light beam having a second wavelength band different from the first wavelength band toward the third direction, a second light source section configured to emit a third light beam having a third wavelength band different from the first wavelength band and the second wavelength band, a first optical element configured to reflect the third light beam, and a second optical element configured to separate the second light beam into a fourth light beam having a fourth wavelength band different from the first wavelength band, the second wavelength band, and the third wavelength band, and a fifth light beam having the third wavelength band, wherein the second light beam enters the second polarization split element along the third direction, the second polarization split element transmits the second light beam polarized in the first polarization direction toward the third direction, and reflects the second light beam polarized in the second polarization direction toward a fourth direction as an opposite direction to the first direction, the first polarization split element transmits the first light beam which is emitted along the third direction from the diffusion element, and reflects the second light beam which enters the first polarization split element along the fourth direction from the second polarization split element, and is polarized in the second polarization direction toward the third direction, and the third light beam reflected by the first optical element enters the wavelength conversion element together with the fifth light beam separated by the second optical element.

According to one aspect of the present disclosure, there is provided a projector including the light source device according to the aspect of the present disclosure, a light modulation device configured to modulate light from the light source device in accordance with image information, and a projection optical device configured to project the light modulated by the light modulation device.

DESCRIPTION OF EXEMPLARY EMBODIMENTS

First Embodiment

A first embodiment of the present disclosure will hereinafter be described using FIG. 1 through FIG. 10.

Figure 1:
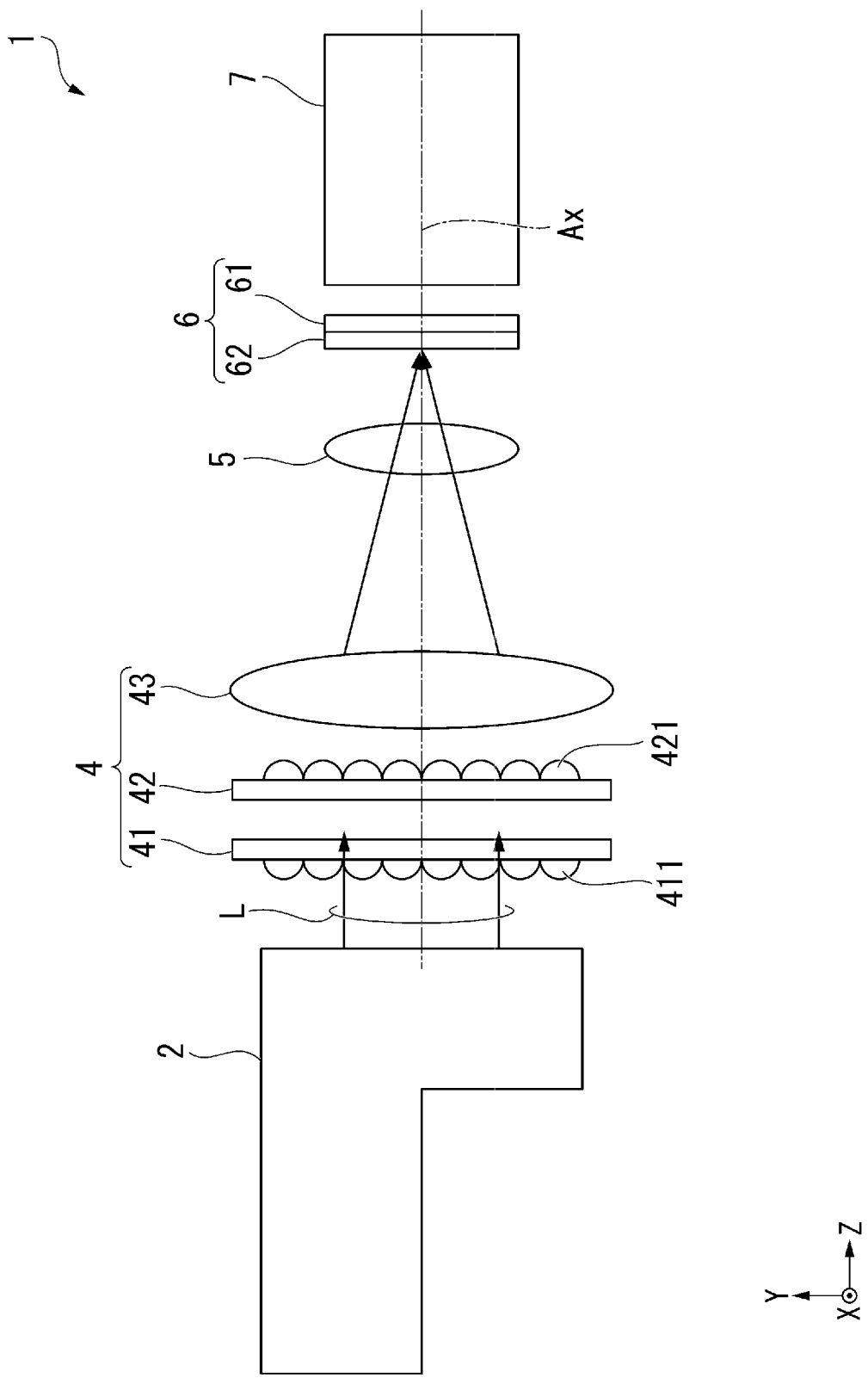
FIG. 1 is a schematic configuration diagram of a projector according to a first embodiment.

FIG. 1 is a schematic configuration diagram of a projector 1 according to the present embodiment.

It should be noted that in each of the drawings described below, the constituents are shown with the scale ratios of respective sizes set differently between the constituents in some cases in order to facilitate the visualization of each of the constituents.

The projector 1 according to the present embodiment modulates the light emitted from a light source device 2 to form an image corresponding to image information, and then projects the image thus formed on a projection target surface such as a screen in an enlarged manner. In other words, the projector 1 modulates the light emitted from the light source device 2 with a single light modulation device 6 including a single liquid crystal panel 61 to thereby form the image, and then projects the image thus formed. The projector 1 is a so-called single-panel projector.

As shown in FIG. 1, the projector 1 is provided with a light source device 2, a homogenization device 4, a field lens 5, a light modulation device 6, and a projection optical device 7. The light source device 2, the homogenization device 4, the field lens 5, the light modulation device 6, and the projection optical device 7 are disposed at predetermined positions along an illumination light axis Ax. The illumination light axis Ax is defined as an axis along the proceeding direction of the principal ray of the light L emitted from the light source 2.

The configuration of the light source device 2 and the homogenization device 4 will be described later in detail.

The field lens 5 is disposed between the homogenization device 4 and the light modulation device 6. The field lens 5 collimates the light L emitted from the homogenization device 4, and then guides the result to the light modulation device 6.

The projection optical device 7 projects the light modulated by the light modulation device 6, namely the light forming the image, on the projection target surface (not shown) such as a screen. The projection optical device 7 has a single projection lens or a plurality of projection lenses.

In the following description, the axis parallel to the proceeding direction of the light emitted from the light source device 2 along the illumination light axis Ax is defined as a Z axis, and the proceeding direction of the light is defined as a +Z direction. Further, two axes each perpendicular to the Z axis, and perpendicular to each other are defined as an X axis and a Y axis. Out of the directions along these axes, an upper side in the vertical direction in the space in which the projector 1 is installed is defined as a +Y direction. Further, the right side in the horizontal direction when viewing an object which the light enters along the +Z direction so that the +Y direction points the upper side in the vertical direction is defined as a +X direction. Although not shown in the drawings, an opposite direction to the +X direction is defined as a −X direction, an opposite direction to the +Y direction is defined as a −Y direction, and an opposite direction to the +Z direction is defined as a −Z direction.

The +X direction in the present embodiment corresponds to a first direction in the appended claims, and the −Z direction in the present embodiment corresponds to a second direction in the appended claims. Further, the +Z direction in the present embodiment corresponds to a third direction in the appended claims, and the −X direction in the present embodiment corresponds to a fourth direction in the appended claims.

Configuration of Light Source Device

Figure 2:
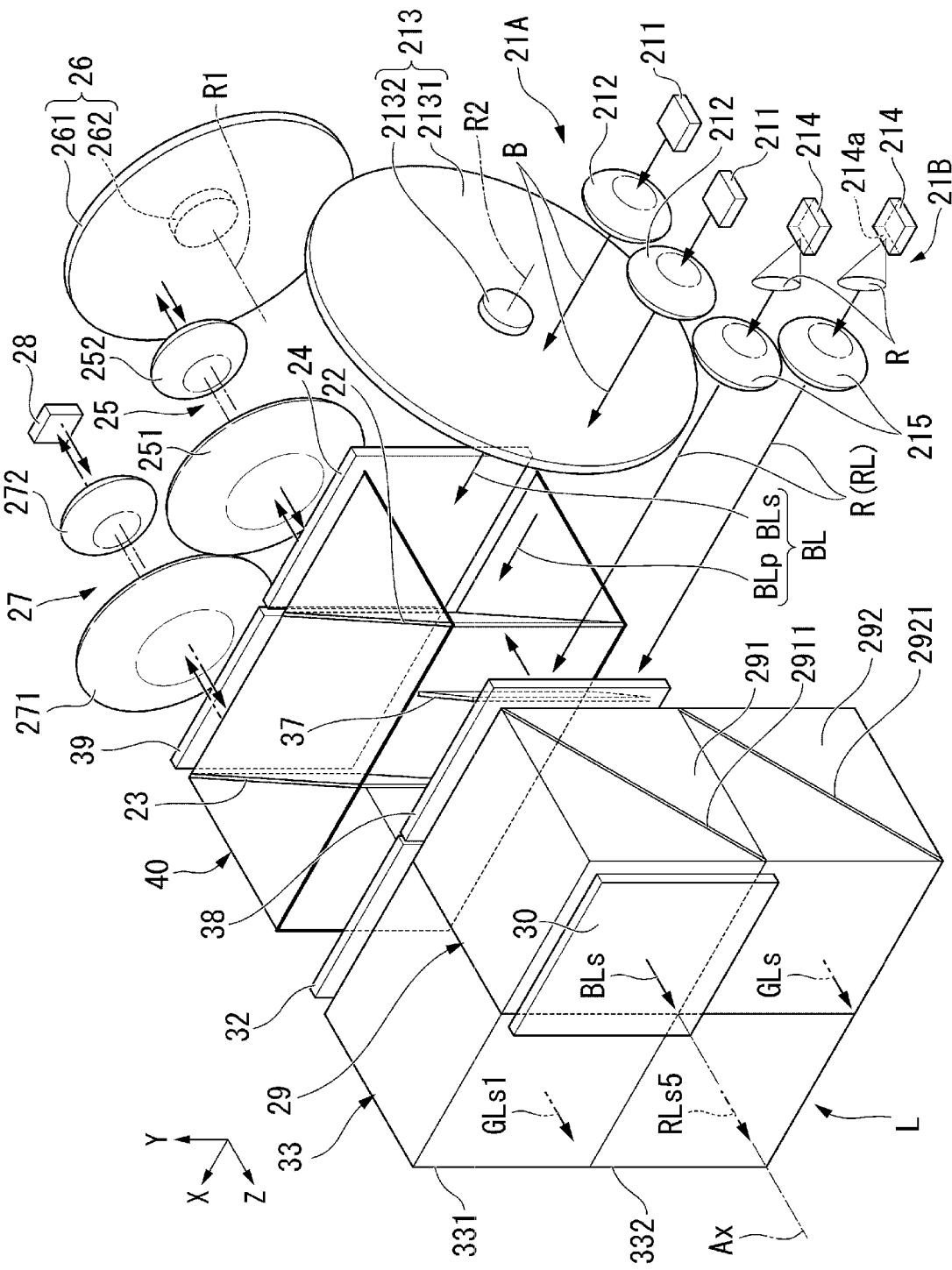
FIG. 2 is a perspective view of a light source device according to the first embodiment.
Figure 3:
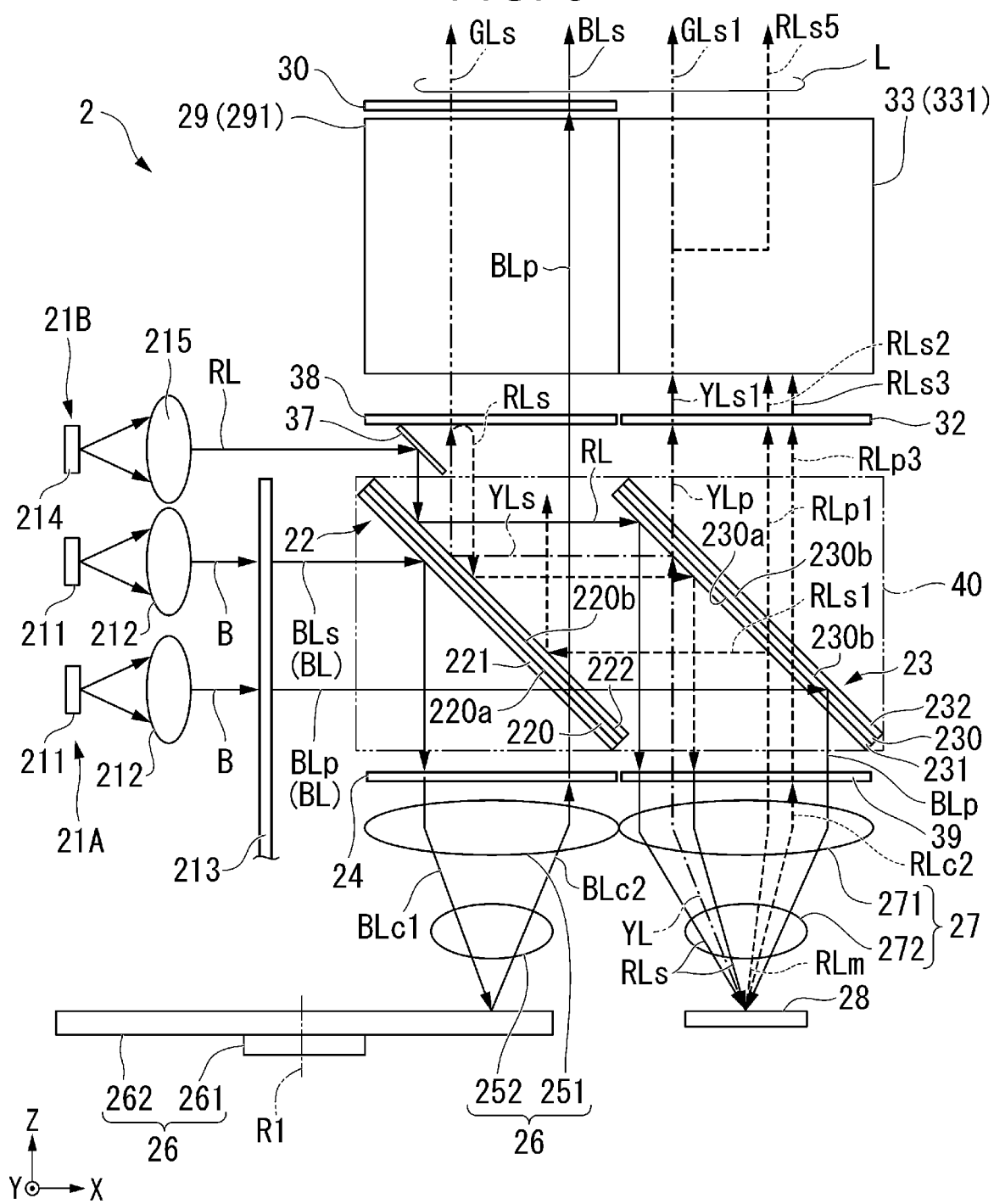
FIG. 3 is a plan view of the light source device viewed from a +Y direction.

FIG. 2 is a perspective view of the light source device 2 according to the present embodiment. FIG. 3 is a plan view of the light source device 2 viewed from the +Y direction.

As shown in FIG. 2 and FIG. 3, the light source device 2 emits the light L for illuminating the light modulation device 6 toward a direction parallel to the illumination light axis Ax, namely the +Z direction. The light L emitted by the light source device 2 includes a plurality of colored light beams which are linearly polarized light beams having a uniform polarization direction, and are spatially separated from each other. In the present embodiment, the light L emitted by the light source device 2 consists of four light beams each formed of S-polarized light. The four light beams correspond to a blue light beam BLs, a green light beam GLs, a green light beam GLs1, and a red light beam RLs5.

The light source device 2 has a first light source section 21A, a second light source section 21B, a first optical member 22, a second optical member 23, a first retardation element 39, a second retardation element 24, a first light collection element 25, a diffusion device 26, a second light collection element 27, a wavelength conversion element 28, a first optical element 37, a second optical element 38, a first color separation element 29, a fourth retardation element 30, a fifth retardation element 32, a second color separation element 33, and a light tunnel 40.

It should be noted that a P-polarization component in the present embodiment corresponds to light polarized in a first polarization direction in the appended claims, and an S-polarization component corresponds to light polarized in a second polarization direction in the appended claims. Further, as described later, the first optical member 22 and the second optical member 23 are different in orientation of a film for separating the polarization components or the colored light beams from the first color separation element 29 and the second color separation element 33. Therefore, the descriptions of P-polarization component and S-polarization component represent the polarization direction with respect to the first optical member 22 and the second optical member 23, and are reversed in the polarization direction with respect to the first color separation element 29 and the second color separation element 33. Specifically, the P-polarization component with respect to the first optical member 22 and the second optical member 23 corresponds to the S-polarization component with respect to the first color separation element and the second color separation element 33, and the S-polarization component with respect to the first optical member 22 and the second optical member 23 corresponds to the P-polarization component with respect to the first color separation element 29 and the second color separation element 33. It should be noted that in order to prevent confusion in the explanation, the P-polarization component and the S-polarization component are described as the polarization directions with respect to the first optical member 22 and the second optical member 23.

Configuration of First Light Source Section

The first light source section 21A emits the blue light beams BLs which enter the first optical member 22 along the +X direction. The first light source section 21A has a plurality of blue light emitting elements 211, a plurality of collimator lenses 212, and a rotary retardation device 213. The blue light emitting elements 211 each formed of a solid-state light source for emitting the blue light beam BLs. Specifically, the blue light emitting elements 211 each formed of a semiconductor laser for emitting the blue light beam B as S-polarized light. The blue light beam B is a laser beam having a blue wavelength band of, for example, 440 through 480 nm, and having a peak wavelength within a range of, for example, 450 through 460 nm. In other words, the blue light emitting elements 211 each emit the blue light beam B having the blue wavelength band. In the present embodiment, the blue light beam B having the blue wavelength band corresponds to light in a first wavelength band in the appended claims.

In the case of the present embodiment, the plurality of blue light emitting elements 211 is arranged along the Z axis.

Although the first light source section 21A in the present embodiment has the two blue light emitting elements 211, the number of the blue light emitting elements 211 is not limited, and the number of the blue light emitting elements 211 can be one. Further, the arrangement of the plurality of blue light emitting elements 211 is not limited as well. Further, the blue light emitting elements 211 are arranged so as to emit the blue light beams B as the S-polarization components, but can be arranged so as to emit the blue light beams B as the P-polarization components since a light intensity ratio between the S-polarized light and the P-polarized light can arbitrarily be set due to the rotary retardation device 213. In other words, it is possible for the blue light emitting elements 211 to rotate as much as 90° centering on the emission optical axis.

The plurality of collimator lenses 212 is disposed between the plurality of blue light emitting elements 211 and the rotary retardation device 213. The collimator lenses 212 are disposed so as to correspond one-to-one to the blue light emitting elements 211. The collimator lens 212 collimates the light emitted from the blue light emitting element 211.

The rotary retardation device 213 has a third retardation element 2131, and a rotary device 2132. The third retardation element 2131 is made rotatable centering on a rotational axis along a proceeding direction of the light entering the third retardation element 2131, namely a rotational axis R2 parallel to the X axis. The rotary device 2132 is formed of a motor and so on, and rotates the third retardation element 2131.

The third retardation element 2131 is formed of a ½ wave plate or a ¼ wave plate with respect to the blue wavelength band. A part of the blue light beam B as the S-polarization component having entered the third retardation element 2131 is converted into a blue light beam BLp as the P-polarization component by the third retardation element 2131. Therefore, the blue light beam having been transmitted through the third retardation element 2131 turns to light in which the blue light beam BLs as the S-polarization component and the blue light beam BLp as the P-polarization component mixed with each other with a predetermined ratio. Specifically, the blue light beams B emitted from the blue light emitting elements 211 enter the third retardation element 2131, and the blue light beam including the blue light beam BLs as the S-polarization component and the blue light beam BLp as the P-polarization component is emitted from the third retardation element 2131.

By the rotary device 2132 adjusting the rotational angle of the third retardation element 2131, the ratio between the light intensity of the blue light beam BLs as the S-polarization component included in the light beam having been transmitted through the third retardation element 2131 and the light intensity of the blue light beam BLp as the P-polarization component included in the light beam having been transmitted through the third retardation element 2131 is adjusted. It should be noted that when there is no need to adjust the ratio between the light intensity of the blue light beam BLs and the light intensity of the blue light beam BLp, the rotary device 2132 for rotating the third retardation element 2131 is not required to be disposed. In that case, the rotational angle of the third retardation element 2131 is set so that the ratio between the light intensity of the blue light beam BLs and the light intensity of the blue light beam BLp becomes a predetermined light intensity ratio, and then the rotational position of the third retardation element 2131 is fixed. In such a manner, the first light source section 21A in the present embodiment emits a first light beam BL having the blue wavelength band and including the blue light beam BLs as the S-polarization component and the blue light beam BLp as the P-polarization component. In the present embodiment, the blue light beam BLp as the P-polarization component corresponds to the light polarized in the first polarization direction in the appended claims, and the blue light beam BLs as the S-polarization component corresponds to the light polarized in the second polarization direction in the appended claims.

It should be noted that in the present embodiment, there is adopted the configuration in which all of the blue light emitting elements 211 emit the blue light beam BLs as the S-polarization component, but it is possible to adopt a configuration in which the blue light emitting element 211 for emitting the blue light beam BLs as the S-polarization component and the blue light emitting element 211 for emitting the blue light beam BLp as the P-polarization component are mixed. According to this configuration, it is also possible to omit the rotary retardation device 213. Further, it is also possible for the blue light emitting element 211 to be formed of another solid-state light source such as an LED (Light Emitting Diode) instead of the semiconductor laser.

Configuration of Second Light Source Section

The second light source section 21B emits red light beams RL which enter the first optical member 22 along the +X direction. The second light source section 21B has a plurality of red light emitting elements 214 and a plurality of collimator lenses 215.

The red light emitting elements 214 each formed of a solid-state light source for emitting the red light beam. Specifically, the red light emitting elements 214 each formed of a semiconductor laser for emitting the red light beam R. The red light beam R is a laser beam having a red wavelength band of, for example, 585 through 720 nm, and having a peak wavelength within a range of, for example, 635 nm±20 nm. In the present embodiment, the red light beam R having the red wavelength band corresponds to light in a third wavelength band in the appended claims.

The plurality of collimator lenses 215 is disposed so as to correspond to the plurality of red light emitting elements 214. The collimator lenses 215 are disposed so as to correspond one-to-one to the red light emitting elements 214. The collimator lens 215 collimates the light emitted from the red light emitting element 214.

In the case of the present embodiment, the plurality of red light emitting elements 214 is arranged along the Y axis.

Although the second light source section 21B in the present embodiment has the two red light emitting elements 214, the number of the red light emitting elements 214 is not limited, and the number of the red light emitting elements 214 can be one.

A light exit surface 214a of the red light emitting element 214 has a substantially rectangular planar shape. In the second light source section 21B in the present embodiment, the red light emitting elements 214 are disposed so that the longitudinal direction of the light exit surface 214a coincides with the Z-axis direction. In this case, the beam shape of the red light beam R emitted from the red light emitting element 214 becomes an elliptical shape having a long axis in a short-side direction (the Y-axis direction) of the light exit surface 214a. The red light beam R is linearly polarized light having the polarization direction parallel to the short-side direction of the light exit surface 214a. In other words, in the second light source section 21B in the present embodiment, the orientation of the red light emitting elements 214 is set so that light as the S-polarization component is emitted as the red light beam R.

The second light source section 21B in the present embodiment is made capable of emitting the red light beam RL toward the first optical member 22, wherein the red light beam RL consists of the red light beams R as the S-polarization components emitted from the plurality of red light emitting elements 214. The red light beam R emitted from each of the red light emitting elements 214 has the elliptical shape having the long axis in the Y-axis direction as described above. In the red light beam RL emitted from the second light source section 21B, the two red light beams R each having the elliptical shape having the long axis in the Y-axis direction are arranged in the Y-axis direction. In this case, the beam shape of the red light beam RL becomes a shape elongated in the Y-axis direction.

Configuration of First Optical Element

The red light beam RL emitted from the second light source section 21B enter the first optical element 37 along the +X direction. The first optical element 37 is disposed at the +Z direction side of the first optical member 22, and at the −Z direction side of the second optical element 38. In other words, the first optical element 37 is disposed between the first optical member 22 and the second optical element 38 in a direction along the Z axis.

The first optical element 37 is formed of a dichroic mirror having a characteristic of transmitting the blue light beam and the green light beam, and reflecting the red light beam. The first optical element 37 is disposed so as to be tilted 45° with respect to the X axis and the Z axis. In other words, the first optical element 37 is tilted 45° with respect to an X-Y plane and a Y-Z plane. Therefore, the red light beam RL emitted from the second light source section 21B toward the +X direction is reflected by the first optical element 37 toward the −Z direction. The red light beam RL having been reflected by the first optical element 37 enters the first optical member 22 along the −Z direction.

As described above, the red light beam RL has the beam shape elongated in the Y-axis direction. Therefore, it is possible for the first optical element 37 in the present embodiment to adopt a reed shape elongated in the Y-axis direction. As described above, according to the first optical element 37 in the present embodiment, since the reed shape elongated in the Y-axis direction is provided, when viewed in the +X direction to form a plan view, the area in the Z-axis direction of the first optical element 37 can be made small. Thus, since the size in the Z-axis direction of the first optical element 37 is reduced, the growth in size in the Z-axis direction of the light source device 2 caused by disposing the first optical element 37 is suppressed.

Configuration of First Optical Member

The first light beam BL including the blue light beam BLs as the S-polarization component and the blue light beam BLp as the P-polarization component enters the first optical member 22 along the +X direction. The second optical member 22 is formed of a plate type polarization split element. The first optical member 22 has a first transparent substrate 220, a first polarization split layer 221, and a first optical layer 222. The first transparent substrate 220 has a first surface 220a and a second surface 220b facing to respective directions opposite to each other. The first transparent substrate 220 is formed of a general optical glass plate.

The first transparent substrate 220 is disposed so as to be tilted 45° with respect to the X axis and the Z axis. In other words, the first transparent substrate 220 is tilted 45° with respect to an X-Y plane and a Y-Z plane.

The first transparent substrate 220 is disposed so that the first surface 220a is directed toward the first light source section 21A. The first polarization split layer 221 is provided to the first surface 220a of the first transparent substrate 220. Therefore, the first polarization split layer 221 is disposed so as to be opposed to the first light source section 21A, and at the same time, tilted 45° with respect to the X-Y plane and the Y-Z plane.

The first polarization split layer 221 has a polarization split characteristic of transmitting the P-polarization component and reflecting the S-polarization component out of the incident light. Further, the first polarization split layer 221 has a polarization split characteristic of transmitting the P-polarized light and reflecting the S-polarized light with respect to the light in the blue wavelength band. Therefore, the first optical member 22 transmits the blue light beam BLp as the P-polarization component along the +X direction, and reflects the blue light beam BLs as the S-polarization component toward the −Z direction out of the blue light beam which enters the first optical member 22 along the +X direction. The first polarization split layer 221 is formed of, for example, a dielectric multilayer film.

The first optical layer 222 is provided to the second surface 220b of the first transparent substrate 220. In other words, the first optical layer 222 is disposed at the +X direction side of the first polarization split layer 221. The first optical layer 222 has an optical characteristic of transmitting the light in the blue wavelength band irrespective of the polarization state, and reflecting light having a wavelength band longer than the blue wavelength band regardless of the polarization state. In the present embodiment, the first optical layer 222 is formed of a dichroic mirror. It should be noted that a dielectric multilayer film having a polarization split characteristic of transmitting the P-polarization component and reflecting the S-polarization component with respect to the light in the blue wavelength band and the yellow wavelength band can be used as the first optical layer 222.

It should be noted that since the first optical member 22 in the present embodiment is the plate type polarization split element, it is possible to separately design a function of the first polarization split layer 221 to be formed on the first surface 220a of the first transparent substrate 220 and a function of the first optical layer 222 to be formed on the second surface 220b of the first transparent substrate 220. Therefore, the film design of the first polarization split layer 221 and the first optical layer 222 becomes relatively easy.

The blue light beam BLp as the P-polarization component having been transmitted through the first polarization split layer 221 is transmitted through the first transparent substrate 220 to enter the first optical layer 222. The blue light beam BLp as the P-polarization component which enters the first optical layer 222 from the first polarization split layer 221 along the +X direction is transmitted by the first optical layer 222 in the +X direction.

According to the first optical member 22 having the configuration described above, it is possible to separate the first light beam BL having been emitted from the first light source section 21A into the blue light beam BLp as the P-polarization component and the blue light beam BLs as the S-polarization component, transmit the blue light BLp as the P-polarization component in the +X direction to thereby make the blue light beam BLp enter the second optical member 23, and reflect the blue light beam BLs as the S-polarization component in the −Z direction to make the blue light beam BLs enter the diffusion device 26.

The first optical member 22 in the present embodiment corresponds to a first polarization split element in the appended claims.

Configuration of Second Optical Member

The second optical member 23 is disposed at the +X direction side of the first optical member 22. In other words, the second optical member 23 is disposed at the +X direction side of the first optical layer 222. The blue light beam BLp as the P-polarization component having been transmitted through the first optical member 22 enters the second optical member 23. Similarly to the first optical member 22, the second optical member 23 is formed of a plate type polarization split element. The second optical member 23 has a second transparent substrate 230, a second polarization split layer 231, and a second optical layer 232.

The second transparent substrate 230 has a third surface 230a and a fourth surface 230b facing to respective directions opposite to each other. The second transparent substrate 230 is formed of a general optical glass plate.

The second transparent substrate 230 is disposed so as to be tilted 45° with respect to the X axis and the Z axis. In other words, the second transparent substrate 230 is tilted 45° with respect to the X-Y plane and the Y-Z plane.

The second transparent substrate 230 is disposed so that the third surface 230a is directed toward the first optical member 22. In other words, the third surface 230a of the second transparent substrate 230 and the second surface 220b of the first transparent substrate 220 are opposed to each other. The second polarization split layer 231 is provided to the third surface 230a of the second transparent substrate 230. Therefore, the second polarization split layer 231 is disposed so as to be opposed to the first optical layer 222, and at the same time, tilted 45° with respect to the X-Y plane and the Y-Z plane.

The second polarization split layer 231 has a polarization split characteristic of transmitting the P-polarization component and reflecting the S-polarization component with respect to the light in the yellow wavelength band. Further, the second polarization split layer 231 has a characteristic of transmitting the P-polarization component with respect to the light in the blue wavelength band. Therefore, the blue light beam BLp as the P-polarization component which enters the second polarization split layer 231 from the first optical layer 222 along the +X direction is transmitted by the second polarization split layer 231 in the +X direction. The second polarization split layer 231 is formed of, for example, a dielectric multilayer film. It should be noted that a dielectric multilayer film having a polarization split characteristic of transmitting the P-polarization component and reflecting the S-polarization component with respect to all of the light in the blue wavelength band, the red wavelength band, and the yellow wavelength band can be used as the second polarization split layer 231.

The second optical layer 232 is provided to the fourth surface 230b of the second transparent substrate 230. In other words, the second optical layer 232 is disposed at the +X direction side of the second polarization split layer 231. The second optical layer 232 has an optical characteristic of reflecting the light in the blue wavelength band, and at the same time, transmitting the light having the wavelength band longer than the blue wavelength band. The blue light beam BLp as the P-polarization component which enters the second optical layer 232 from the second polarization split layer 231 along the +X direction is reflected by the second optical layer 232 in the −Z direction.

In the present embodiment, since the second optical layer 232 is formed of the dichroic mirror, it is possible for the second optical layer 232 to accurately separate the incident light by reflecting or transmitting the incident light without using the polarization.

According to the second optical member 23 in the configuration described above, the blue light beam BLp as the P-polarization component having been transmitted through the first optical member 22 to enter the second optical member 23 in the +X direction can be reflected in the −Z direction to enter the wavelength conversion element 28.

Since the second optical member 23 in the present embodiment is the plate type polarization split element, it is possible to separately design a function of the second polarization split layer 231 to be formed on the third surface 230a of the second transparent substrate 230 and a function of the second optical layer 232 to be formed on the fourth surface 230b of the second transparent substrate 230. Therefore, the film design of the second polarization split layer 231 and the second optical layer 232 becomes relatively easy.

The second optical member 23 in the present embodiment corresponds to a second polarization split element in the appended claims.

Configuration of Second Retardation Element

The second retardation element 24 is disposed at the −Z direction side of the first optical member 22. In other words, the second retardation element 24 is disposed between the first optical member 22 and the diffusion device 26 on the Z axis. The blue light beam BLs as the S-polarization component which has been reflected by the first polarization split 221 of the first optical member 22 in the −Z direction enters the second retardation element 24. The second retardation element 24 is formed of a ¼ wave plate with respect to the blue wavelength band of the blue light beam BLs which enters the ¼ wave plate. The blue light beam BLs as the S-polarization component having been reflected by the first optical member 22 is converted by the second retardation element 24 into, for example, a blue light beam BLc1 as clockwise circularly polarized light, and is then emitted toward the first light collection element 25. In other words, the second retardation element 24 converts the polarization state of the blue light beam BLs which enters the second retardation element 24.

Configuration of First Light Collection Element

The first light collection element 25 is disposed at the −Z direction side of the second retardation element 24. In other words, the first light collection element 25 is disposed between the second retardation element 24 and the diffusion device 26 on the Z axis. The first light collection element 25 converges the blue light beam BLc1 which enters the first light collection element 25 from the second retardation element 24 on a diffusion plate 261 of the diffusion device 26. Further, the first light collection element 25 collimates a blue light beam BLc2 described later entering the first light collection element 25 from the diffusion device 26. It should be noted that although in the example shown in FIG. 3, the first light collection element 25 is constituted by a first lens 251 and a second lens 252, the number of lenses constituting the first light collection element 25 is not limited.

Configuration of Diffusion Device

The diffusion device 26 is disposed at the −Z direction side of the first light collection element 25. In other words, the diffusion device 26 is disposed at the −Z direction side of the first optical member 22. The blue light beam BLc1 entering the diffusion device 26 from the first light collection element 25 in the −Z direction is reflected by the diffusion device 26 the +Z direction while diffusing the blue light beam BLc1 so as to have an equivalent diffusion angle to that of the yellow light beam YL emitted from the wavelength conversion element 28 described later. The diffusion device 26 is provided with a diffusion plate 261 and a rotary device 262. The diffusion plate 261 preferably has a reflection characteristic as close to the Lambertian scattering as possible, and reflects the blue light beam BLc1 having entered the diffusion plate 261 in a wide-angle manner. The rotary device 262 is formed of a motor and so on, and rotates the diffusion plate 261 centering on a rotational axis R1 parallel to the +Z direction.

The diffusion plate 261 in the present embodiment corresponds to a diffusion element in the appended claims.

The blue light beam BLc1 having entered the diffusion plate 261 is reflected by the diffusion plate 261 to thereby be converted into the blue light beam BLc2 as circularly polarized light having an opposite rotational direction. In other words, the blue light BLc1 as the clockwise circularly polarized light is converted by the diffusion plate 261 into the blue light BLc2 as counterclockwise circularly polarized light. The blue light beam BLc2 emitted from the diffusion device 26 passes the first light collection element 25 toward the +Z direction, and then enters the second retardation element 24 once again. On this occasion, the blue light beam BLc2 entering the second retardation element 24 from the first light collection element 25 is converted by the second retardation element 24 into the blue light beam BLp as the P-polarization component. The blue light beam BLp thus converted enters the first optical member 22. In other words, the blue light beam BLp which is emitted from the diffusion plate 261 along the +Z direction, and then enters the first polarization split layer 221 is transmitted by the first polarization split layer 221 in the +Z direction. The blue light beam BLp which is emitted from the first polarization split layer 221 along the +Z direction, and is transmitted through the first transparent substrate 220, and enters the first optical layer 222 is transmitted by the first optical layer 222 in the +Z direction. In such a manner, the blue light beam BLp thus converted is emitted from the first optical member 22 in the +Z direction, and then enters the second optical element 38. It should be noted that since the first optical element 37 disposed between the second optical element 38 and the first optical member 22 has a characteristic of transmitting the blue light beam, the blue light beam BLp enters the second optical element 38 without being blocked by the first optical element 37.

Configuration of Second Light Collection Element

The second light collection element 27 is disposed at the −Z direction side of the second optical member 23. In other words, the second light collection element 27 is disposed between the second optical member 23 and the wavelength conversion element 28 on the Z axis. The second light collection element 27 converges the blue light beam BLs reflected by the second optical member 23 on the wavelength conversion element 28. Further, the second light collection element 27 collimates the yellow light beam YL which is emitted from the wavelength conversion element 28 and is described later, and then emits the result toward the second optical member 23. It should be noted that although in the example shown in FIG. 3, the second light collection element 27 is constituted by a first lens 271 and a second lens 272, the number of lenses constituting the second light collection element 27 is not limited.

Configuration of Wavelength Conversion Element

The wavelength conversion element 28 is disposed at the −Z direction side of the second light collection element 27. In other words, the wavelength conversion element 28 is disposed at the −Z direction side of the second optical member 23. The wavelength conversion element 28 is a reflective wavelength conversion element which is excited by the light entering the wavelength conversion element, and emits the light different in wavelength from the light having entered the wavelength conversion element toward an opposite direction to the incident direction of the light. In other words, the wavelength conversion element 28 performs the wavelength conversion on the incident light, and then emits the light on which the wavelength conversion has been performed toward the opposite direction to the incident direction of the light.

In the present embodiment, the wavelength conversion element 28 includes a yellow phosphor which is excited by blue light and emits yellow light. Specifically, the wavelength conversion element 28 includes, for example, an yttrium aluminum garnet (YAG) type phosphor containing cerium (Ce) as an activator agent. The wavelength conversion element 28 emits fluorescence having a yellow wavelength band longer than the blue wavelength band of the blue light beam BLp entering the wavelength conversion element 28 along the −Z direction from the second optical layer 232 of the second optical member 23, namely the yellow light beam YL as unpolarized light, toward the +Z direction. The yellow light beam YL has a wavelength band of, for example, 500 through 650 nm. The yellow light beam YL is light which includes a green light component and a red light component, and in which the S-polarization component and the P-polarization component are mixed with each other in each of the colored light components.

The fluorescence having the yellow wavelength band in the present embodiment, namely the yellow light beam YL as the unpolarized light, corresponds to second light having a second wavelength band in the appended claims.

The yellow light beam YL emitted from the wavelength conversion element 28 is transmitted by the second light collection element 27 toward the +Z direction to thereby be collimated, and then enters the second optical member 23. Although the wavelength conversion element 28 in the present embodiment is a stationary wavelength conversion element, instead of this configuration, it is possible to use a rotary wavelength conversion element provided with a rotary device for rotating the wavelength conversion element 28 centering on a rotational axis parallel to the Z axis. In this case, a rise in temperature of the wavelength conversion element 28 is suppressed, and thus, it is possible to increase the wavelength conversion efficiency.

As described above, the second polarization split layer 231 of the second optical member 23 has a polarization split characteristic of reflecting the S-polarized light and transmitting the P-polarized light out of the incident light. Therefore, out of the yellow light beam YL as unpolarized light having entered the second polarization split layer 231, the yellow light beam YLs as the S-polarization component is reflected by the second polarization split layer 231 toward the −X direction, and then enters the first optical layer 222 of the first optical member 22. As described above, the first optical layer 222 has an optical characteristic of reflecting the light having a longer wavelength band than the blue wavelength band irrespective of the polarization state. Therefore, the yellow light beam YLs as the S-polarization component which enters the first optical layer 222 along the −X direction is reflected by the first optical layer 222 toward the +Z direction. The yellow light beam YLs as the S-polarization component enters the second optical element 38.

Meanwhile, out of the yellow light beam YL as unpolarized light having entered the second polarization split layer 231, the yellow light beam YLp as the P-polarization component is transmitted through the second polarization split layer 231 toward the +Z direction to enter the second optical layer 232. As described above, the second optical layer 232 has an optical characteristic of transmitting the light having the longer wavelength band than the blue wavelength band. Therefore, the yellow light beam YLp as the P-polarization component which enters the second optical layer 232 from the second polarization split layer 231 along the +Z direction is transmitted by the second optical layer 232 in the +Z direction.

According to the second optical member 23 in the present embodiment, it is possible to emit the yellow light beam YLp as the P-polarization component toward the +Z direction.

In the present embodiment, the yellow light beam YLp as the P-polarization component corresponds to a second light beam polarized in the first polarization direction in the appended claims, and the yellow light beam YLs as the S-polarization component corresponds to the second light beam polarized in the second polarization direction in the appended claims.

Configuration of Light Tunnel

Figure 4:
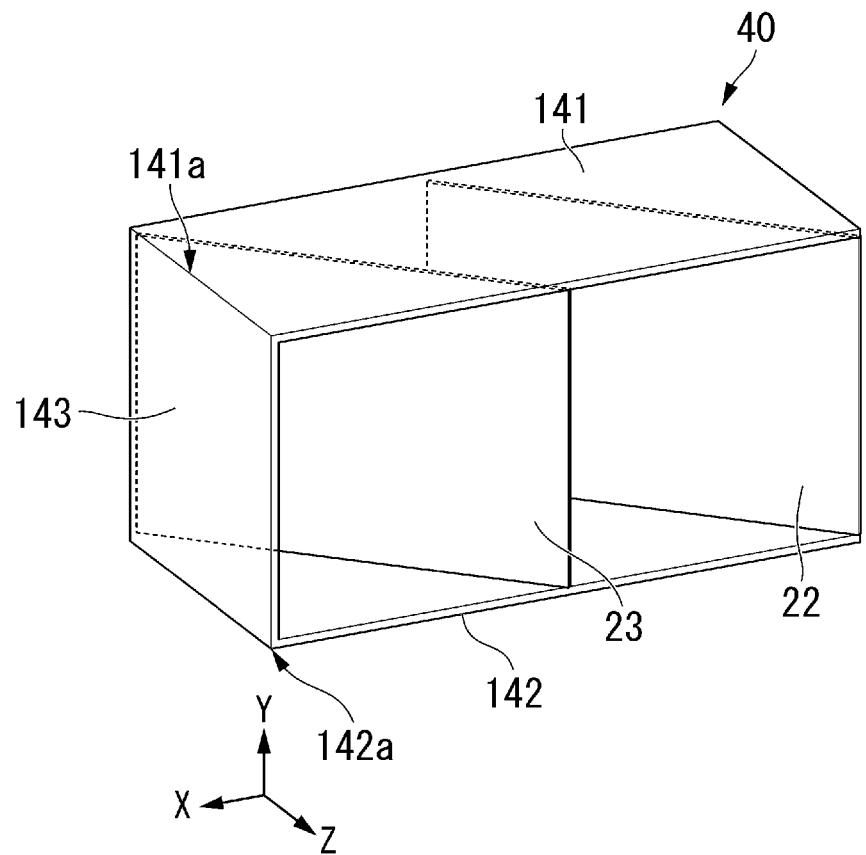
FIG. 4 is a perspective view showing a configuration of a light tunnel.
Figure 5:
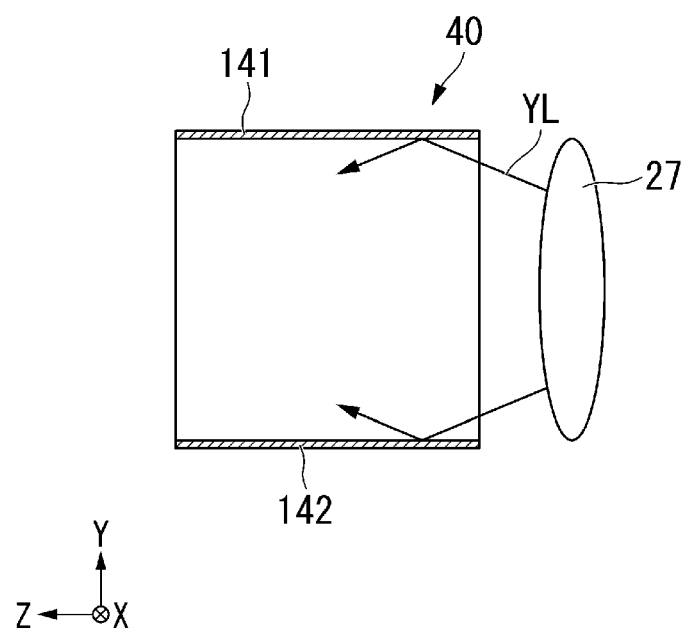
FIG. 5 is a side view of the light source device viewed from a −X direction toward a +X direction.

FIG. 4 is a perspective view showing a configuration of the light tunnel 40. FIG. 5 is a side view of the light tunnel 40 viewed from the −X direction toward the +X direction.

As shown in FIG. 4, the light tunnel 40 has a first mirror 141, a second mirror 142, and a third mirror 143. The first mirror 141, the second mirror 142, and the third mirror 143 are bonded to each other with an adhesive or the like. Further, the first transparent substrate 220 and the second transparent substrate 230 are bonded to the first mirror 141 and the second mirror 142 with an adhesive or the like. In the light tunnel 40 constituted by the first mirror 141, the second mirror 142, and the third mirror 143, all of the surfaces at the sides opposed respectively to the first optical member 22 and the second optical member 23 are made to be reflecting surfaces. Thus, the light tunnel 40 has a function of reflecting the light which proceeds toward the optical element in the posterior stage in a spreading manner to thereby suppress the loss of the light. Further, the light tunnel 40 has a function as a support member for supporting the first transparent substrate 220 and the second transparent substrate 230.

The first mirror 141 is disposed at the +Y direction side of the first transparent substrate 220 and the second transparent substrate 230. In the first mirror 141, at least an inner surface side which faces the first transparent substrate 220 and the second transparent substrate 230 is made to be a light reflecting surface.

The second mirror 142 is disposed at the −Y direction side of the first transparent substrate 220 and the second transparent substrate 230. In the second mirror 142, at least an inner surface side which faces the first transparent substrate 220 and the second transparent substrate 230 is made to be a light reflecting surface. The first mirror 141 and the second mirror 142 are disposed along the X-Y plane, and are opposed to each other.

The third mirror 143 is disposed so as to cross the first transparent substrate 220 and the second transparent substrate 230. The third mirror 143 is disposed along the Y-Z plane to couple an end part 141a at the +X direction side of the first mirror 141 and an end part 142a at the +X direction side of the second mirror 142 to each other. The third mirror 143 and the second transparent substrate 230 forms an angle of 45°. In the third mirror 143, at least an inner surface side which faces the second transparent substrate 230 is made to be a light reflecting surface.

It should be noted that in the present embodiment, the +Y direction corresponds to a fifth direction in the appended claims, and the −Y direction corresponds to a sixth direction in the appended claims.

It should be noted that the light tunnel 40 is not necessarily required to have the configuration in which the three plate members are bonded to each other as in the present embodiment, and can have a configuration in which at least two plate members are integrally formed.

Although in the present embodiment, the yellow light beam YL emitted from the wavelength conversion element 28 is substantially collimated by the second light collection element 27, some components thereof enter the second optical member 23 in a diverging state. Here, as a comparative example, a light source device obtained by eliminating the light tunnel 40 from the light source device 2 according to the present embodiment will be considered.

Since the second optical member 23 is the plate type polarization split element, when the light tunnel 40 is not provided as in the light source device according to the comparative example, there is a possibility that a part of the yellow light beam YL emitted from the second light collection element 27 spreads outside the second optical member 23, and thus, the light use efficiency of the yellow light beam YL decreases. It should be noted that when using the plate type polarization split element as the second optical member 23, it becomes possible to deflect the light, which is emitted from the second light collection element 27 with a wide angle, using a prism surface to take the light inside, but it become unachievable to obtain an advantage such as easiness of the film design due to the use of the plate type polarization split element.

In contrast, in the light source device 2 according to the present embodiment is provided with the light tunnel 40, by reflecting the yellow light beam YL having spread in the Y direction using the first mirror 141 and the second mirror 142, it is possible to take the yellow light beam YL in the second optical member 23 as shown in FIG. 5. In other words, according to the light source device 2 related to the present embodiment, it is possible to take the light, which is emitted with a wide angle from the second light collection element, inside as when configuring the second optical member with a prism type polarization split element despite the plate type polarization split element is used as the second optical member 23. Thus, it is possible to increase the light use efficiency of the yellow light beam YL.

It should be noted that although not shown in the drawings, for example, the yellow light beam YL having spread in the +X direction is reflected by the third mirror 143, and can therefore be taken in the second optical member 23. Further, by reflecting the blue light beam BLp having been emitted from the first light collection element 25 and having spread in the Y direction using the first mirror 141 and the second mirror 142, it is possible to take the blue light beam BLp in the first optical member 22. Thus, it is possible to increase the light use efficiency of the blue light beam BLp. Further, regarding the first light beam BL having been emitted from the first light source section 21A in the state of spreading in the Y direction, by reflecting the first light beam BL using the first mirror 141 and the second mirror 142, it is possible to efficiently take the first light beam BL in the first optical member 22. Thus, it is possible to increase the light use efficiency of the first light beam BL.

Configuration of Second Optical Element

The second optical element 38 is disposed at the +Z direction side of the first optical member 22. The second optical element 38 is formed of a dichroic mirror having a characteristic of transmitting the blue light beam and the green light beam, and reflecting the red light beam. The second optical element 38 separates the yellow light beam YLs which enters the second optical element 38 along the +Z direction from the first optical layer 222 of the first optical member 22 into the green light beam GLs and the red light beam RLs, and transmits the blue light beam BLp which enters the second optical element 38 along the +Z direction from the first optical layer 222. The green light beam GLs is light having a green wavelength band out of the wavelength band of the yellow light beam YLs, and the red light beam RLs is light having a red wavelength band out of the wavelength band of the yellow light beam YLs.

The light having the green wavelength band in the present embodiment, namely the green light beam GLs, corresponds to a fourth light beam having a fourth wavelength band different from the first wavelength band, the second wavelength band, and the third wavelength band in the appended claims. Further, the light having the red wavelength band in the present embodiment, namely the red light beam RLs, corresponds to a fifth light beam having the third wavelength band in the appended claims.

The green light beam GLs included in the yellow light beam YLs is transmitted through the second optical element 38, and is then emitted toward the +Z direction. In contrast, the red light beam RLs included in the yellow light beam YLs is reflected by the second optical element 38. A component which fails to enter the first optical element 37 out of the red light beam RLs having been reflected by the second optical element 38 enters the first optical layer 222 of the first optical member 22. As described above, the first optical layer 222 has a characteristic of reflecting the yellow light beam YLs, and therefore, reflects the red light beam RLs included in the yellow light beam YLs. The red light beam RLs having been reflected by the first optical layer 222 enters the second polarization split layer 231 of the second optical member 23. As described above, the second polarization split layer 231 has a characteristic of reflecting the yellow light beam YLs, and therefore, reflects the red light beam RLs included in the yellow light beam YLs. The red light beam RLs is collected by the second light collection element 27 enters, and then enters the wavelength conversion element 28. In other words, the red light beam RLs separated from the yellow light beam YLs in the second optical element 38 is reflected by each of the first optical layer 222 and the second polarization split layer 231 to thereby enter the wavelength conversion element 28.

Further, the red light beam RL which has been reflected by the first optical element 37 to enter the first optical member 22 is reflected by each of the first optical layer 222 and the second polarization split layer 231 to thereby enter the wavelength conversion element 28. In other words, the red light beam RL having been reflected by the first optical element 37 enters the wavelength conversion element 28 together with the red light beam RLs separated by the second optical element 38.

In the light source device 2 according to the present embodiment, there is provided the first retardation element 39 disposed on the light path of the red light beam RL between the second polarization split layer 231 and the wavelength conversion element 28. The red light beam RL having been reflected by the first optical element 37 and the red light beam RLs separated by the second optical element 38 enter the wavelength conversion element 28 via the first retardation element 39.

The first retardation element 39 is formed of a ¼ wave plate with respect to the red wavelength band of the red light beam RL, RLs which enters the ¼ wave plate. The first retardation element 39 is formed of a wavelength-selective retardation element which has a characteristic of providing a phase difference as much as ¼ of the red wavelength band to the red light, and not providing the phase difference to the light having a wavelength band other than the red wavelength band, namely the blue light and the yellow light. Specifically, as the wavelength-selective retardation element, it is possible to use ColorSelect® (trade name; product of ColorLink Inc.).

Thus, the first retardation element 39 provides the phase difference of ¼ only to the light in the red wavelength band. Since the red light beam RL is constituted by the red light beams R as the S-polarization components as described above, the red light beam RL is the linearly polarized light similar to the red light beam RLs. Therefore, the red light beam RLs and the red light beam RL are converted by the first retardation element 39 into, for example, the red light beam RLc1 as the clockwise circularly polarized light, and is then emitted toward the second light collection element 27. In other words, the first retardation element 39 converts the polarization state of the red light beam RLs and the red light beam RL which enter the first retardation element 39. The red light beam RLc1 which has been converted by the first retardation element 39 into the clockwise circularly polarized light enters the wavelength conversion element 28.

Figure 6:
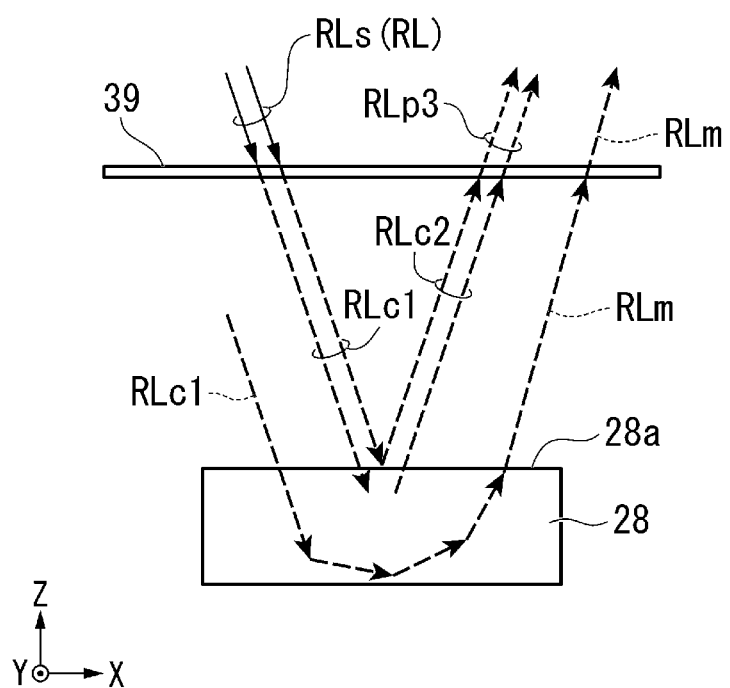
FIG. 6 is a schematic diagram showing a polarization state of a red light beam which enters a wavelength conversion element.

FIG. 6 is a schematic diagram showing the polarization state of the red light which is transmitted through the first retardation element 39 and then enters the wavelength conversion element 28. In FIG. 6, illustration of the second light collection element 27 is omitted in order to make the drawing eye-friendly.

As described above, since the yellow phosphor included in the wavelength conversion element 28 hardly absorbs the yellow light beam having entered the wavelength conversion element 28 from the outside, the yellow phosphor hardly absorbs the red light beam RLs. Therefore, the red light beam RLc1 having entered the wavelength conversion element 28 is repeatedly reflected inside the wavelength conversion element 28 to thereby be emitted outside the wavelength conversion element 28 as the red light beam RLm as unpolarized light including the S-polarized light and the P-polarized light mixed with each other as shown in FIG. 6 together with the yellow light beam YL generated in the yellow phosphor. The red light beam RLm as the unpolarized light emitted from the wavelength conversion element 28 includes the red light beam as the S-polarization component and the red light beam as the P-polarization component half and half.

In contrast, out of the red light beam RLc1 having entered the wavelength conversion element 28, the light reflected by the surface 28a of the wavelength conversion element 28, or the light back-scattered by the surface layer of the wavelength conversion element 28 is hardly disturbed in polarization. Therefore, the red light beam RLc1 which has been surface-reflected, or back-scattered by the wavelength conversion element 28 is emitted from the wavelength conversion element 28 as the red light beam RLc2 as counterclockwise circularly polarized light. The red light beam RLc2 as the counterclockwise circularly polarized light passes the second light collection element 27 toward the +Z direction, and then enters the first retardation element 39 once again. On this occasion, the red light beam RLc2 which enters the first retardation element 39 from the second light collection element 27 is converted by the first retardation element 39 into the red light beam RLp3 as the P-polarization component. The red light beam RLp3 thus converted enters the second optical member 23.

The red light beam RLp3 as the P-polarization component having entered the second optical member 23 is transmitted through the second optical member 23 and then emitted toward the +Z direction similarly to the yellow light beam YLp, and is then converted into the red light beam RLs3 as the S-polarization component by the fifth retardation element 32. In other words, according to the light source device 2 related to the present embodiment, since the first retardation element 39 is provided, the red light beam RLs3 which has been surface-reflected or back-scattered by the wavelength conversion element 28 can be taken out to the outside as the red light.

It should be noted that the red light beam RLm emitted as the unpolarized light from the wavelength conversion element 28 is kept unpolarized when being transmitted through the first retardation element 39. Therefore, the amount of the red light beam RLm as the unpolarized light taken out to the outside is the same irrespective of presence or absence of the first retardation element 39.

Similarly to the yellow light beam YLp, the red light beam RLm as the unpolarized light having entered the second optical member 23 is separated by the second polarization split layer 231 into the red light beam RLp1 as the P-polarization component and the red light beam RLs1 as the S-polarization component as shown in FIG. 3. In other words, similarly to the yellow light beam YLs, the red light beam RLs1 as the S-polarization component enters the first optical element 37 via the second polarization split layer 231 and the first optical layer 222, and is then reflected by the first optical element 37 to thereby return to the wavelength conversion element 28 once again. Further, the red light beam RLp1 as the P-polarization component which has been transmitted through the second polarization split layer 231 in the +Z direction is transmitted by the second optical layer 232 in the +Z direction. In other words, similarly to the yellow light beam YLp, the red light beam RLp1 as the P-polarization component is emitted from the second optical member 23 toward the +Z direction.

In the present embodiment, the red light beam RLm as the unpolarized light corresponds to the third light beam and the fifth light beam emitted from the wavelength conversion element in the appended claims. Further, the red light beam RLp1 as the P-polarization component corresponds to the light polarized in the first polarization direction in the appended claims. Further, the red light beam RLs1 as the S-polarization component corresponds to the light polarized in the second polarization direction in the appended claims.

Configuration of First Color Separation Element

Figure 7:
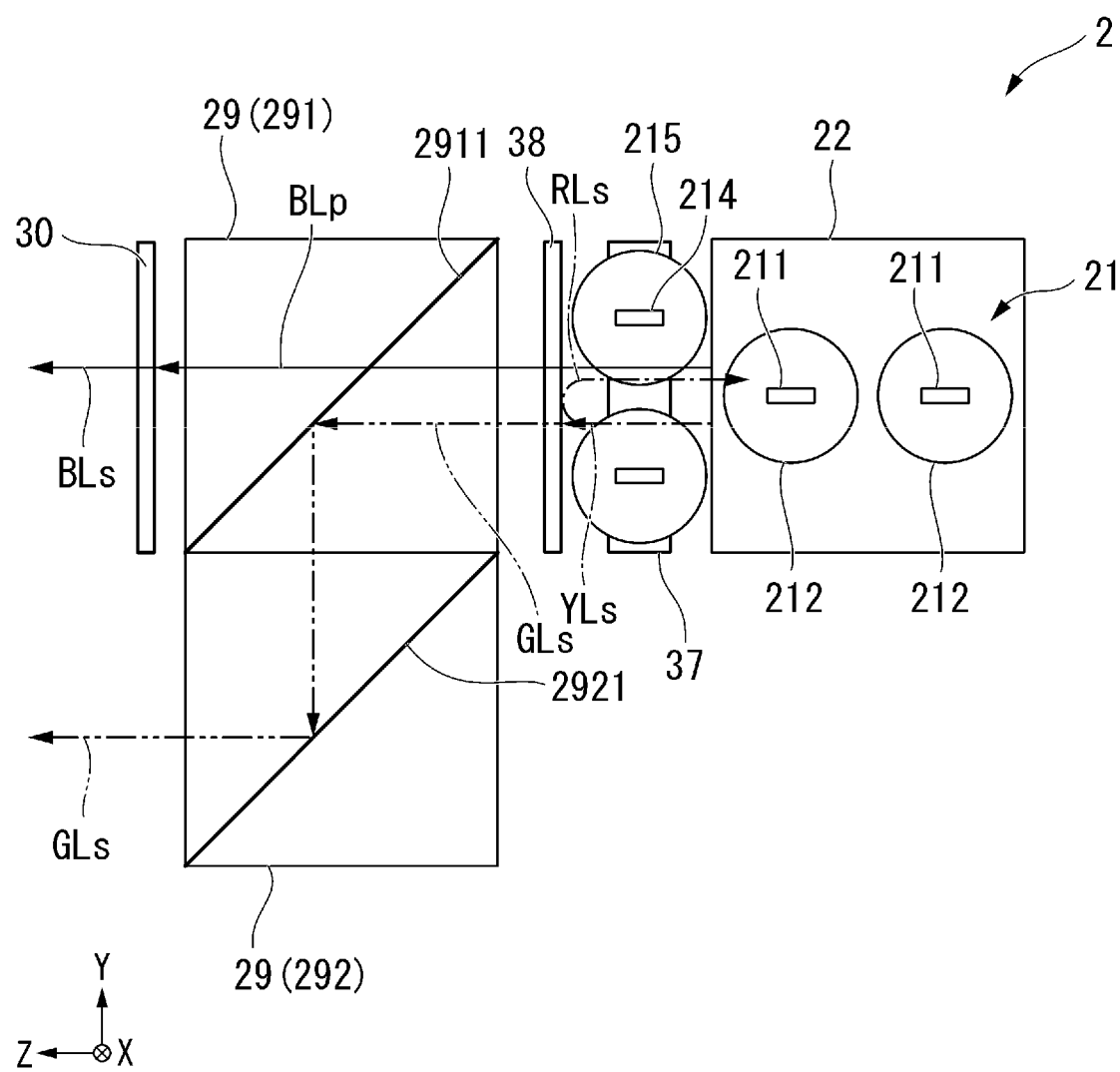
FIG. 7 is a side view of the light source device viewed from the −X direction.

FIG. 7 is a side view of the light source device 2 viewed from the −X direction. In other words, FIG. 7 shows the state of the first color separation element 29, the fourth retardation element 30, and so on viewed from the −X direction. In FIG. 7, in order to make the drawing eye-friendly, illustration of the rotary retardation device 213, the second retardation element 24, the first light collection element 25, the diffusion device 26, and so on is omitted.

As shown in FIG. 7, the first color separation element 29 is disposed at the +Z direction side of the first optical member 22. The first color separation element 29 has a dichroic prism 291 and a reflecting prism 292. The dichroic prism 291 and the reflecting prism 292 are arranged side by side along the Y axis. The first color separation element 29 separates the light emitted toward the +Z direction from the first optical member 22 into the blue light beam BLp and the green light beam GLs.

The light including the blue light beam BLp and the green light beam GLs emitted from the first optical member 22 enters the dichroic prism 291. The dichroic prism 291 is formed of a prism type color separation element formed by combining two base members each having a substantially isosceles right triangular prismatic shape with each other to form a substantially rectangular solid shape. On the interface between the two base members, there is disposed a color separation layer 2911. The color separation layer 2911 is tilted 45° with respect to the Y axis and the Z axis. In other words, the color separation layer 2911 is tilted 45° with respect to the X-Y plane and the X-Z plane.

The color separation layer 2911 functions as a dichroic mirror which transmits the blue light beam and reflects a colored light beam having a longer wavelength band than the blue wavelength band, namely the green light beam, out of the incident light. Therefore, the blue light beam BLp out of the light beam having entered the dichroic prism 291 from the first optical member 22 is transmitted through the color separation layer 2911 toward the +Z direction to be emitted outside the dichroic prism 291.

In contrast, the green light beam GLs out of the light beam having entered the dichroic prism 291 from the first optical member 22 is reflected toward the −Y direction by the color separation layer 2911. It should be noted that it is possible to adopt a dichroic mirror having the color separation layer 2911 instead of the dichroic prism 291. Further, it is possible for the first color separation element 29 to have a configuration having a polarization split element having a polarization split layer, and the reflecting prism 292. Even when a polarization split element which, for example, transmits the blue light beam BLp having entered the polarization split element toward the +Z direction, and reflects the green light beam GLs in the −Y direction toward the reflecting prism 292 is adopted in the first color separation element 29 instead of the dichroic prism 291, it is possible to separate the blue light beam BLp and the green light beam GLs from each other similarly to the first color separation element 29 having the dichroic prism 291.

The reflecting prism 292 is disposed at the −Y direction side of the dichroic prism 291. The green light beam GLs reflected by the color separation layer 2911 enters the reflecting prism 292. The reflecting prism 292 is a prism type reflecting element formed by combining two base members each having a substantially isosceles right triangular prismatic shape with each other to form a substantially rectangular solid shape. On the interface between the two base members, there is disposed a reflecting layer 2921. The reflecting layer 2921 is tilted 45° with respect to the +Y direction and the +Z direction. In other words, the reflecting layer 2921 is tilted 45° with respect to the X-Y plane and the X-Z plane. In other words, the reflecting layer 2921 and the color separation layer 2911 are arranged in parallel to each other.

The green light beam GLs which enters the reflecting layer 2921 in the −Y direction from the dichroic prism 291 is reflected toward the +Z direction by the reflecting layer 2921. The green light beam GLs reflected by the reflecting layer 2921 is emitted from the reflecting prism 292 toward the +Z direction. It should be noted that it is possible to adopt a reflecting mirror having the reflecting layer 2921 instead of the reflecting prism 292.

Configuration of Fourth Retardation Element

The fourth retardation element 30 is disposed at the +Z direction side of the dichroic prism 291. In other words, the fourth retardation element 30 is disposed on the light path of the blue light beam BLp emitted from the dichroic prism 291. The fourth retardation element 30 is formed of a ½ wave plate with respect to the blue wavelength band which the blue light beam BLp entering the ½ wave plate has. The fourth retardation element 30 converts the blue light beam BLp which enters the fourth retardation element 30 from the dichroic prism 291 into the blue light beam BLs as the S-polarization component. The blue light beam BLs having been converted by the fourth retardation element 30 into the S-polarization component is emitted from the light source device 2 toward the +Z direction, and then enters the homogenization device 4 shown in FIG. 1. It should be noted that the fourth retardation element 30 can be disposed so as to have contact with a surface from which the blue light beam BLp is emitted of the dichroic prism 291.

In other words, the green light beam GLs is spatially separated from the blue light beam BLs, and is emitted from an exit position different from the exit position of the blue light beam BLs in the light source device 2, and then enters the homogenization device 4. In particular, the green light beam GLs is emitted from the exit position distant toward the −Y direction from the exit position of the blue light beam BLs in the light source device 2, and then enters the homogenization device 4.

Configuration of Fifth Retardation Element

Figure 8:
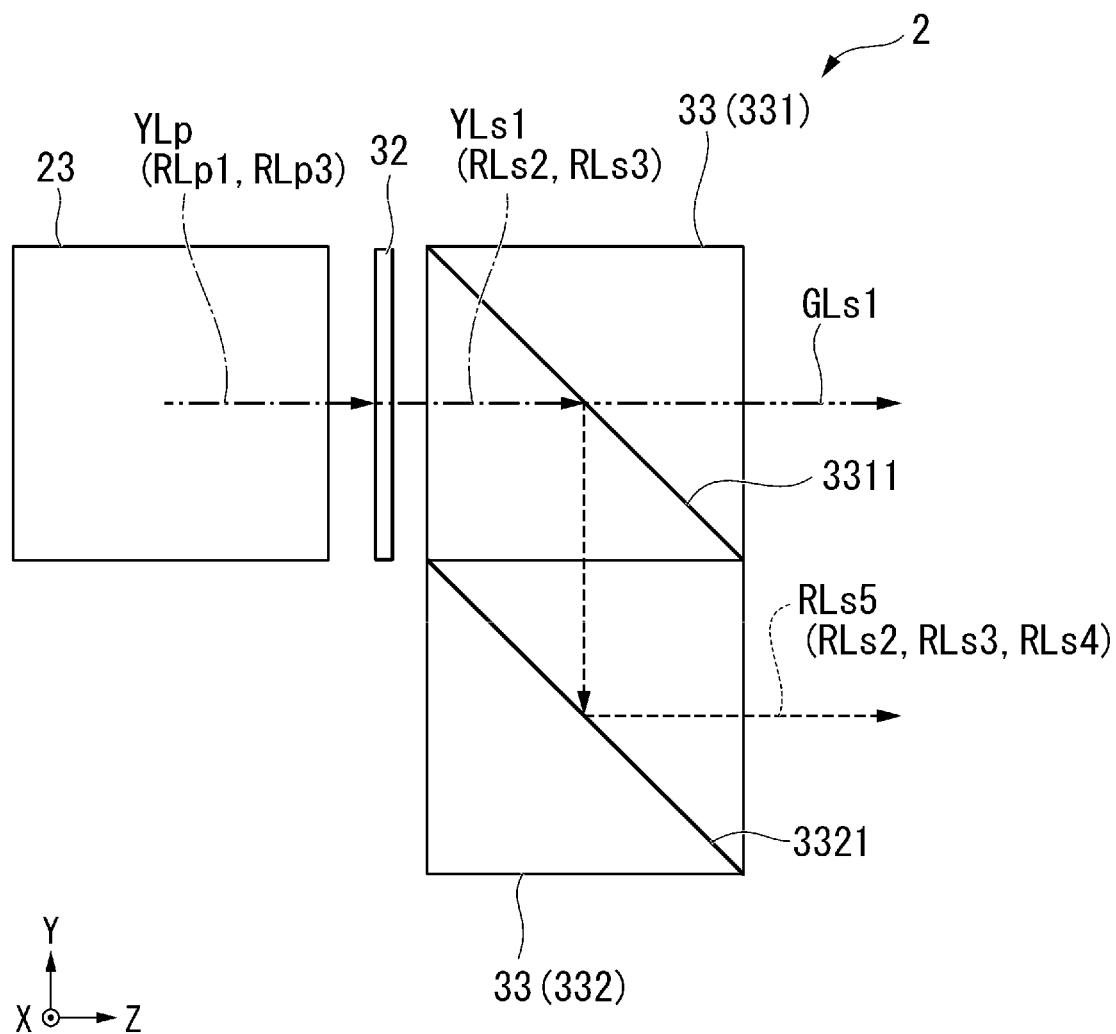
FIG. 8 is a side view of the light source device viewed from the +X direction.

FIG. 8 is a side view of the light source device 2 viewed from the +X direction. In other words, FIG. 8 shows the fifth retardation element 32 and the second color separation element 33 viewed from the +X direction. It should be noted that in FIG. 8, the second light collection element 27 and the wavelength conversion element 28 are omitted from the illustration.

As shown in FIG. 3 and FIG. 8, the fifth retardation element 32 is disposed at the +Z direction side of the second optical member 23. The yellow light beam YLp having been transmitted through the second optical member 23 enters the fifth retardation element 32. The red light beam RLp1 which is separated from the yellow light beam YLs by the first optical element 37, then emitted from the wavelength conversion element 28, and is then transmitted through the second optical member enters the fifth retardation element 32. The fifth retardation element 32 is formed of a ½ wave plate with respect to the yellow wavelength band of the yellow light beam YLp and the red wavelength band of the red light beam RLp1. The fifth retardation element 32 converts the yellow light beam YLp as the P-polarization component into the yellow light beam YLs1 as the S-polarization component, and converts the red light beam RLp1 as the P-polarization component into the red light beam RLs2 as the S-polarization component. The yellow light beam YLs1 and the red light beam RLs2 each converted into the S-polarization component enter the second color separation element 33.

Configuration of Second Color Separation Element

As shown in FIG. 8, the second color separation element 33 is disposed at the +Z direction side of the fifth retardation element 32. In other words, the second color separation element 33 is disposed at the +Z direction side of the second optical member 23. The second color separation element 33 has a dichroic prism 331 and a reflecting prism 332. The dichroic prism 331 and the reflecting prism 332 are arranged side by side along the Y axis. The yellow light beam YLs1 which has been emitted from the second optical member 23 toward the +Z direction and then converted by the fifth retardation element 32 into the S-polarization component is separated by the second color separation element 33 into a green light beam GLs1 and a red light beam RLs4.

The dichroic prism 331 is formed of a prism type color separation element similarly to the dichroic prism 291. On the interface between the two base members, there is disposed a color separation layer 3311. The color separation layer 3311 is tilted 45° with respect to the +Y direction and the +Z direction. In other words, the color separation layer 3311 is tilted 45° with respect to the X-Y plane and the X-Z plane. The color separation layer 3311 and the reflecting layer 3321 are arranged in parallel to each other.

The color separation layer 3311 functions as a dichroic mirror for transmitting the green light component of the incident light, and reflecting the red light component thereof. Therefore, the green light beam GLs1 as the S-polarization component out of the yellow light beam YLs1 having entered the dichroic prism 331 is transmitted through the color separation layer 3311 toward the +Z direction to be emitted outside the dichroic prism 331. The green light beam GLs1 as the S-polarization component is emitted from the light source device 2 toward the +Z direction, and then enters the homogenization device 4. In other words, the green light beam GLs1 is spatially separated from the blue light beam BLs and the green light beam GLs, and is emitted from a position different from those of the blue light beam BLs and the green light beam GLs, and then enters the homogenization device 4. In other words, the green light beam GLs1 is emitted from the exit position distant toward the +X direction from the exit position of the blue light beam BLs in the light source device 2, and then enters the homogenization device 4.

In contrast, the red light beam RLs4 as the S-polarization component out of the yellow light beam YLs1 having entered the dichroic prism 331 is reflected toward the −Y direction by the color separation layer 3311. Further, the red light beam RLs2 and the red light beam RLs3 having been converted by the fifth retardation element 32 into the S-polarization component are reflected by the color separation layer 3311 toward the −Y direction together with the red light beam RLs4. It should be noted that it is possible to use a dichroic mirror having the color separation layer 3311 instead of the dichroic prism 331.

The reflecting prism 332 has substantially the same configuration as the reflecting prism 292. Specifically, the reflecting prism 332 has a reflecting layer 3321 which is parallel to the color separation layer 3311, and the reflecting layer 2921.

The red light beam RLs2, the red light beam RLs3, and the red light beam RLs4 which are reflected by the color separation layer 3311, and then enter the reflecting layer 3321 are reflected by the reflecting layer 3321 toward the +Z direction. The red light beam RLs2, the red light beam RLs3, and the red light beam RLs4 having been reflected by the reflecting layer 3321 are emitted outside the reflecting prism 332. Hereinafter, the red light beam RLs2, the red light beam RLs3, and the red light beam RLs4 are correctively referred to simply as a red light beam RLs5.

The red light beam RLs5 is emitted from the light source device 2 toward the +Z direction, and then enters the homogenization device 4. In other words, the red light beam RLs5 is spatially separated from the blue light beam BLs, the green light beam GLs, and the green light beam GLs1, and is emitted from a position different from those of the blue light beam BLs, the green light beam GLs, and the green light beam GLs1, and then enters the homogenization device 4. In other words, the red light beam RLs5 is emitted from the exit position which is distant toward the −Y direction from the exit position of the green light beam GLs1 in the light source device 2, and is distant toward the +X direction from the exit position of the green light beam GLs, and then enters the homogenization device 4.

Configuration of Homogenization Device

As shown in FIG. 1, the homogenization device 4 homogenizes the illuminance in the image formation area of the light modulation device 6 irradiated with the light beams emitted from the light source device 2. The homogenization device 4 has a first multi-lens 41, a second multi-lens 42, and a superimposing lens 43.

The first multi-lens 41 has a plurality of lenses 411 arranged in a matrix in a plane perpendicular to a central axis of the light L entering the first multi-lens 41 from the light source device 2, namely the illumination light axis Ax. The first multi-lens 41 divides the light entering the first multi-lens 41 from the light source device 2 into a plurality of partial light beams with the plurality of lenses 411.

Figure 9:
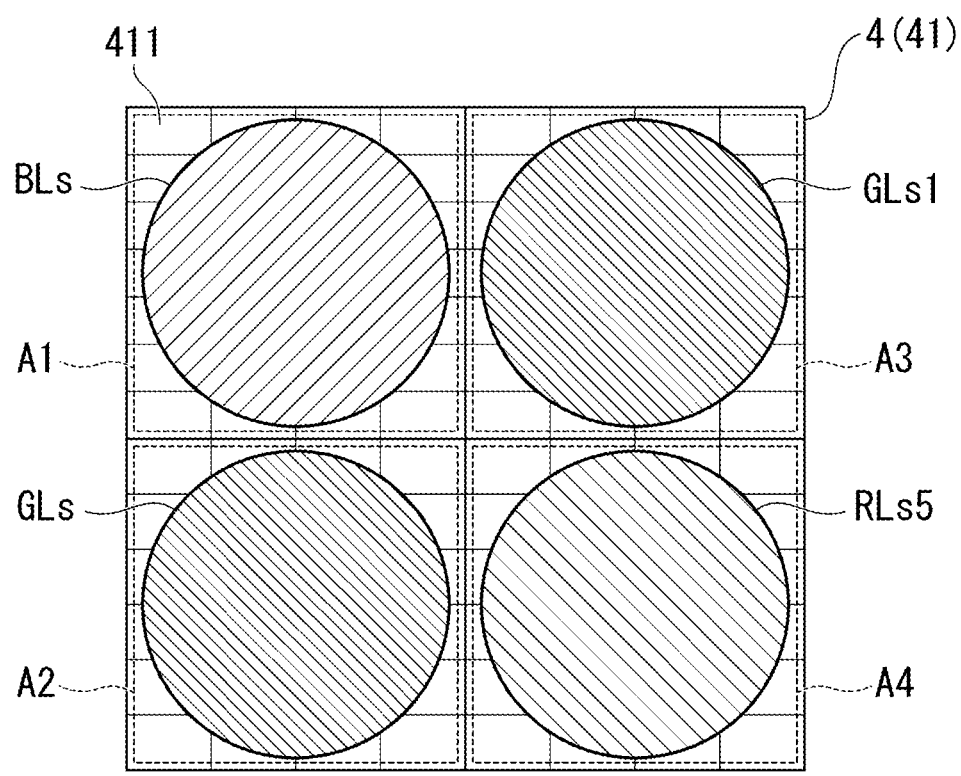
FIG. 9 is a schematic diagram showing positions of incidence of colored light beams on a multi-lens.

FIG. 9 is a schematic diagram showing positions of incidence of the respective colored light beams in the first multi-lens 41 viewed from the −Z direction.

As shown in FIG. 9, the blue light beam BLs, the green light beam GLs, the green light beam GLs1, and the red light beam RLs5 emitted from the light source device 2 enter the first multi-lens 41. The blue light beam BLs emitted from the position at the −X direction side and at the +Y direction side in the light source device 2 enters a plurality of lenses 411 included in an area A1 located at the −X direction side and at the +Y direction side in the first multi-lens 41. Further, the green light beam GLs emitted from the position at the −X direction side and at the −Y direction side in the light source device 2 enters a plurality of lenses 411 included in an area A2 located at the −X direction side and at the −Y direction side in the first multi-lens 41.

The green light beam GLs1 emitted from the position at the +X direction side and at the +Y direction side in the light source device 2 enters a plurality of lenses 411 included in an area A3 located at the +X direction side and at the +Y direction side in the first multi-lens 41. The red light beam RLs5 emitted from the position at the +X direction side and at the −Y direction side in the light source device 2 enters a plurality of lenses 411 included in an area A4 located at the +X direction side and at the −Y direction side in the first multi-lens 41. Each of the colored light beams having entered the lenses 411 turns to a plurality of partial light beams, and enters lenses 421 corresponding respectively to the lenses 411 in the second multi-lens 42.

Out of the light L emitted from the light source device 2 according to the present embodiment, the blue light beam BLs corresponds to a sixth light beam in the appended claims, the green light beam GLs corresponds to a seventh light beam in the appended claims, the green light beam GLs1 corresponds to an eighth light beam in the appended claims, and the red light beam RLs5 corresponds to a ninth light beam in the appended claims.

As shown in FIG. 1, the second multi-lens 42 has the plurality of lenses 421 which is arranged in a matrix in a plane perpendicular to the illumination light axis Ax, and at the same time, corresponds respectively to the plurality of lenses 411 of the first multi-lens 41. The plurality of partial light beams emitted from the lenses 411 corresponding respectively to the lenses 421 enters the respective lenses 421. Each of the lenses 421 makes the partial light beam having entered the lens 421 enter the superimposing lens 43.

The superimposing lens 43 superimposes the plurality of partial light beams entering the superimposing lens 43 from the second multi-lens 42 on each other in the image formation area of the light modulation device 6. In particular, the second multi-lens 42 and the superimposing lens 43 make the blue light beam BLs, the green light beam GLs, the green light beam GLs1, and the red light beam RLs5 each divided into the plurality of partial light beams enter a plurality of microlenses 621 constituting a microlens array 62 described later of the light modulation device 6 at respective angles different from each other via the field lens 5.

Configuration of Light Modulation Device

As shown in FIG. 1, the light modulation device 6 modulates the light emitted from the light source device 2. In particular, the light modulation device 6 modulates each of the colored light beams which are emitted from the light source device 2, and then enter the light modulation device 6 via the homogenization device 4 and the field lens 5 in accordance with image information to form the image light corresponding to the image information. The light modulation device 6 is provided with the single liquid crystal panel 61 and a single microlens array 62.

Configuration of Liquid Crystal Panel

Figure 10:
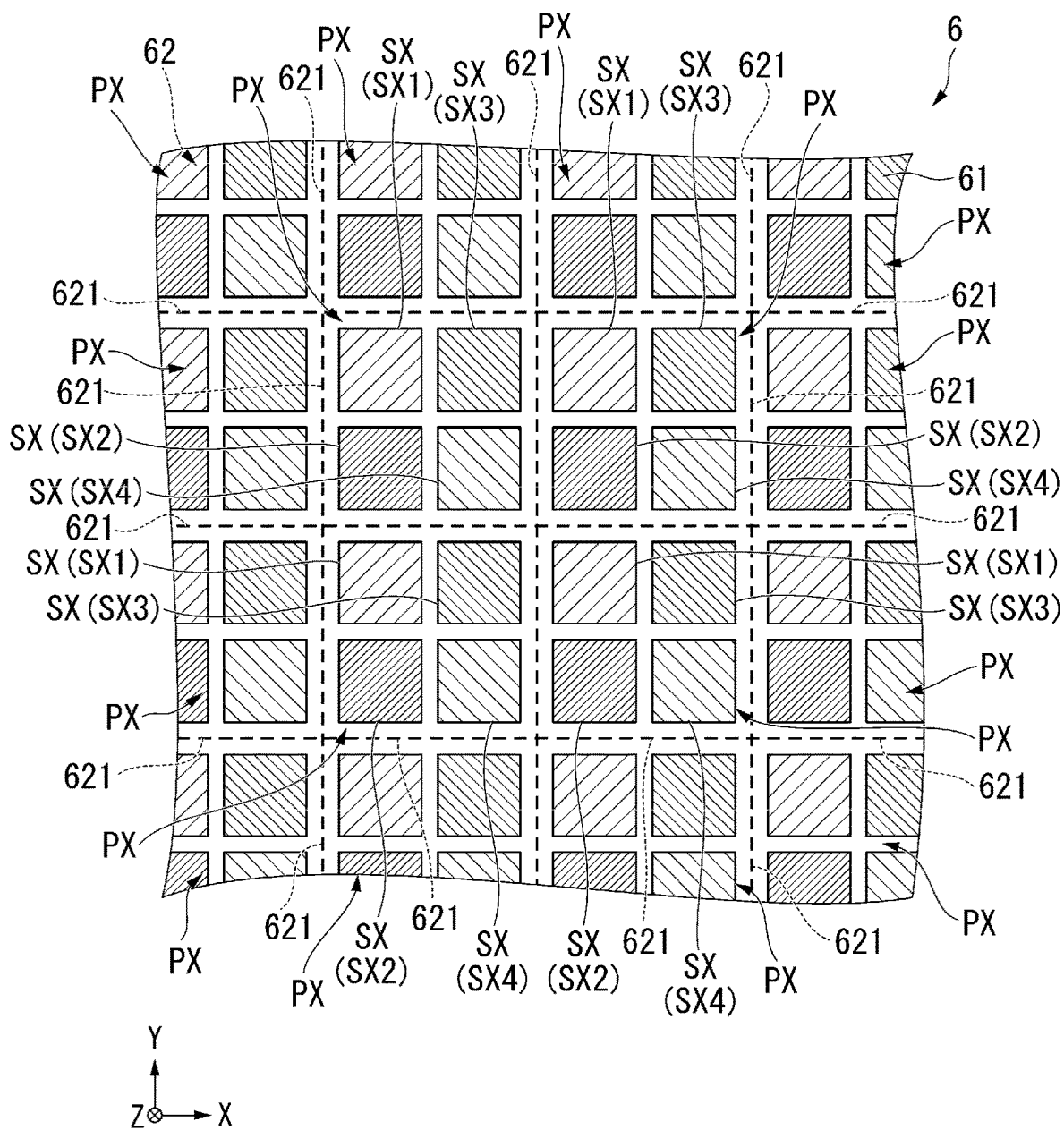
FIG. 10 is an enlarged view of a light modulation device.

FIG. 10 is a schematic enlarged view of a part of the light modulation device 6 viewed from the −Z direction. In other words, FIG. 10 shows a correspondence relationship between the pixels PX provided to the liquid crystal panel 61 and the microlenses 621 provided to the microlens array 62.

As shown in FIG. 10, the liquid crystal panel 61 has the plurality of pixels PX arranged in a matrix in a plane perpendicular to the illumination light axis Ax.

Each of the pixels PX has a plurality of sub-pixels SX for respectively modulating colored light beams different in color from each other. In the present embodiment, each of the pixels PX has four sub-pixels SX (SX1 through SX4). Specifically, in one pixel PX, the first sub-pixel SX1 is disposed at a position at the −X direction side and at the +Y direction side. The second sub-pixel SX2 is disposed at a position at the −X direction side and at the −Y direction side. The third sub-pixel SX3 is disposed at a position at the +X direction side and at the +Y direction side. The fourth sub-pixel SX4 is disposed at a position at the +X direction side and at the −Y direction side.

Configuration of Microlens Array

As shown in FIG. 1, the microlens array 62 is disposed at the −Z direction side as the side of incidence of light with respect to the liquid crystal panel 61. The microlens array 62 guides the colored light beams entering the microlens array 62 to the individual pixels PX. The microlens array 62 has the plurality of microlenses 621 corresponding to the plurality of pixels PX.

As shown in FIG. 10, the plurality of microlenses 621 is arranged in a matrix in a plane perpendicular to the illumination light axis Ax. In other words, the plurality of microlenses 621 is arranged in a matrix in an orthogonal plane with respect to the central axis of the light entering the plurality of microlenses 621 from the field lens 5. In the present embodiment, one microlens 621 is disposed so as to correspond to the two sub-pixels arranged in the +X direction and the two sub-pixels arranged in the +Y direction. In other words, one microlens 621 is disposed so as to correspond to the four sub-pixels SX1 through SX4 arranged 2×2 in the X-Y plane.

The blue light beam BLs, the green light beam GLs, the green light beam GLs1, and the red light beam RLs5 superimposed by the homogenization device 4 enter the microlenses 621 at respective angles different from each other. The microlenses 621 make the colored light beams entering the microlens 621 enter the sub-pixels SX corresponding to the colored light beams. Specifically, the microlens 621 makes the blue light beam BLs enter the first sub-pixel SX1 out of the sub-pixels SX of the pixel PX corresponding to the microlens 621, makes the green light beam GLs enter the second sub-pixel SX2, makes the green light beam GLs1 enter the third sub-pixel SX3, and makes the red light beam RLs5 enter the fourth sub-pixel SX4. Thus, the colored light beams corresponding respectively to the sub-pixels SX1 through SX4 enter the respective sub-pixels SX1 through SX4, and the colored light beams are respectively modulated by the corresponding sub-pixels SX1 through SX4. In such a manner, the image light modulated by the liquid crystal panel 61 is projected by the projection optical device 7 on the projection target surface not shown.

Advantages of First Embodiment

In the related-art projector described in Document 1, the lamp is used as the light source. Since the light emitted from the lamp is not uniform in polarization direction, in order to use the liquid crystal panel as the light modulation device, a polarization conversion device for uniforming the polarization direction becomes necessary. For the projector, there is generally used the polarization conversion device provided with a multi-lens array and a polarization split element (PBS) array. However, in order to reduce the size of the projector, there are required the multi-lens array and the PBS array narrow in pitch, but it is extremely difficult to form the PBS array narrow in pitch.

To cope with this problem, in the present embodiment, the four colors of colored light beams uniform in the polarization direction, namely the blue light beam BLs as the S-polarization component, the green light beam GLs as the S-polarization component, the green light beam GLs1 as the S-polarization component, and the red light beam RLs5 as the S-polarization component, are emitted from the light source device 2. According to this configuration, it is possible to realize the light source device 2 capable of emitting the plurality of colored light beams spatially separated from each other and uniformed in the polarization direction without using the polarization conversion element narrow in pitch described above. Thus, it is possible to reduce the light source device 2 in size, and by extension, it is possible to achieve reduction in size of the projector 1.

Further, in the projector 1 according to the present embodiment, since the green light beams enter the two sub-pixels SX2, SX3 out of the four sub-pixels SX in the light modulation device 6, it is possible to increase the light intensity of the green light entering the pixel PX. Thus, it is possible to increase the luminosity factor of the projection image.

Further, in the light source device 2 according to the present embodiment, there are provided the first light source section 21A for emitting the first light beam BL having the blue wavelength band and including the blue light beam BLp as the P-polarization component and the blue light beam BLs as the S-polarization component, the first optical member 22 which transmits the blue light beam BLp entering the first optical member 22 along the +X direction from the first light source section 21A toward the +X direction, and reflects the blue light beam BLs toward the −Z direction, the second optical member 23 which is disposed at the +X direction side of the first optical member 22, and reflects the blue light beam BLp entering the second optical member 23 along the +X direction from the first optical member 22 toward the −Z direction, the diffusion plate 261 which diffuses the blue light beam BLc1 entering the diffusion plate 261 along the −Z direction from the first optical member 22, and emits the blue light beam BLc2 thus diffused toward the +Z direction, the wavelength conversion element 28 which is disposed at the −Z direction side of the second optical member 23, performs the wavelength conversion on the blue light beam BLp entering the wavelength conversion element 28 along the −Z direction from the second optical member 23 to emit the yellow light beam YL having the yellow wavelength band toward the +Z direction, the second light source section 21B for emitting the red light beam RL having the red wavelength band, the first optical element 37 for reflecting the red light beam RL, and the second optical element 38 for separating the yellow light beam YLs into the green light beam GLs and the red light beam RLs. The yellow light beam YL enters the second optical member 23 along the +Z direction, and the second optical member 23 transmits the yellow light beam YLp toward the +Z direction, and reflects the yellow light beam YLs toward the −X direction, the first optical member 22 transmits the blue light beam BLc2 which is emitted from the diffusion plate 261 along the +Z direction, and reflects the yellow light beam YLs which enters the first optical member 22 along the −X direction from the second optical member 23 toward the +Z direction, and the red light beam RL having been reflected by the first optical element 37 enters the wavelength conversion element 28 together with the red light beam RLs separated by the second optical element 38.

According to the light source device 2 related to the present embodiment, by making the red light beam RL emitted from the second light source section 21B enter the wavelength conversion element 28 in addition to the red light beam RLs separated from the yellow light beam YLs by the second color separation element 38, it is possible to emit the red light beam RLm as the unpolarized light from the wavelength conversion element 28 in addition to the yellow light beam YL. Similarly to the yellow light beam YLp, the red light beam RLp1 as the P-polarization component which is a part of the red light beam RLm as the unpolarized light is emitted toward the +Z direction from the second optical member 23.

In the case of the present embodiment, since the red light beam RL emitted from the second light source section 21B is made to enter the wavelength conversion element 28, it is possible to increase the light intensity of the red component entering the pixel PX and the color gamut of the red color compared to when generating the red light beam RLs5 only with the red component separated from the yellow light beam YL. Therefore, it is possible to improve the color reproducibility in the red light of the projection image.

Further, in the present embodiment, by making the red light beam RLs separated from the yellow light beam YLs in the second optical element 38 enter the wavelength conversion element 28, a part of the red component separated from the yellow light beam YL by the second optical element 38 is reused as the red light beam RLs5, and therefore, it is possible to increase the light use efficiency of the red component.

Here, when attempting to give priority to the color balance of the projection image when the light intensity of the red light is insufficient, it becomes necessary to suppress the light intensity of the rest of the colored light in accordance with the red light, there arises a problem that the luminance of the projection image decreases. In contrast, according to the light source device 2 related to the present embodiment, since it is possible to ensure the sufficient light intensity of the red light, there is no need to suppress the light intensity of the rest of the colored light in accordance with the red light, and it is possible to obtain the projection image high in luminance and excellent in color balance.

Further, in the light source device 2 according to the present embodiment, there is adopted the configuration further provided with the first retardation element 39 which is disposed on the light path of the red light beam RL between the second optical member 23 and the wavelength conversion element 28, and provides the red light beam RL with the phase difference as much as ¼ of the red wavelength band.

According to this configuration, the red light beam RLp3 which has been emitted from the wavelength conversion element 28 with the polarization undisturbed can be taken out to the outside as a part of the red light beam RLs5 by the first retardation element 39 disposed between the second optical member 23 and the wavelength conversion element 28. In other words, it is possible to increase the light intensity of the red light beam RLs5 as much as the red light beam RLs3. Therefore, it is possible to further improve the color reproducibility in the red light of the projection image.

Further, in the light source device 2 according to the present embodiment, the second optical member 23 is provided with the configuration of separating the red light beam RLm which is emitted from the wavelength conversion element 28 to enter the second optical member 23 along the +Z direction into the red light beam RLp1 and the red light beam RLs1, and then transmitting the red light beam RLp toward the +Z direction.

According to this configuration, the red light beam RLp1 separated from the red light beam RLm as unpolarized light can be taken out to the outside as a part of the red light beam RLs5. In other words, by increasing the light intensity of the red light beam RLs5, it is possible to further improve the color reproducibility in the red light of the projection image.

Further, in the light source device 2 according to the present embodiment, there is adopted the configuration in which the first optical element 37 is disposed at the −Z direction side of the second optical element 38, and at the same time, disposed at the +Z direction side of the first optical member 22, and the second optical element 38 is disposed at the −Z direction side of the first color separation element 29.

In the case of the present embodiment, the red light beam RL reflected by the first optical element 37 and the red light beam RLs separated by the second optical element 38 are reflected by the first optical member 22 toward the +X direction. The red light beam RL and the red light beam RLs which are reflected by the first optical member 22 and then enter the second optical member 23 along the +X direction are reflected by the second optical member 23 toward the −Z direction, and the red light beam RL and the red light beam RLs reflected by the second optical member 23 enter the wavelength conversion element 28.

According to the configuration of the present embodiment, it is possible to make the red light beam RL emitted from the second light source section 21B enter the wavelength conversion element 28 together with the red light beam RLs separated from the yellow light beam YLs in the second optical element 38.

Further, in the light source device 2 according to the present embodiment, there is adopted the configuration further provided with the second retardation element 24 which is disposed between the first optical member 22 and the diffusion plate 261, and which the blue light beam BLs enters along the −Z direction from the first optical member 22.

According to this configuration, since the second retardation element 24 is disposed between the first optical member 22 and the first light collection element 25, it is possible to convert the blue light beam BLc2 as the circularly polarized light emitted from the diffusion device 26 into the blue light beam BLp as the P-polarization component to be transmitted through the first polarization split layer 221 of the first optical member 22. Thus, it is possible to increase the use efficiency of the blue light beam BLc2 emitted from the diffusion device 26.

Further, in the light source device 2 according to the present embodiment, the first light source section 21A is provided with the configuration including the blue light emitting elements 211, and the third retardation element 2131 which the light emitted from the blue light emitting elements 211 enters, and which emits the first light beam BL.

According to this configuration, since the first light source section 21A is provided with the third retardation element 2131, it is possible to surely make the blue light beam BLp as the P-polarization component and the blue light beam BLs as the S-polarization component enter the first optical member 22. Further, according to this configuration, since the polarization directions of the light beams emitted from the plurality of blue light emitting elements 211 are allowed to be the same, it is sufficient to dispose the same solid-state light sources in the same orientation, and thus, it is possible to simplify the configuration of the first light source section 21A.

Further, in the light source device 2 according to the present embodiment, there is adopted the configuration in which the third retardation element 2131 can rotate centering on the rotational axis extending along the proceeding direction of the light entering the third retardation element 2131.

According to this configuration, since the third retardation element 2131 is made capable of rotating around the rotational axis R2 extending along the +X direction, by adjusting the rotational angle of the third retardation element 2131, it is possible to adjust the ratio between the light intensity of the blue light beam BLs and the light intensity of the blue light beam BLp entering the first optical member 22. Thus, since it is possible to adjust the ratio in the light intensity of the four colored light beams emitted from the light source device 2, it is possible to adjust the white balance of the light source device 2.

Further, in the light source device 2 according to the present embodiment, there is adopted the configuration further provided with the first color separation element 29 which is disposed at the +Z direction side of the first optical member 22, and separates the light emitted from the first optical member 22 into the blue light beam BLp having the blue wavelength band and the green light beam GLs having the green wavelength band, and the second color separation element 33 which is disposed at the +Z direction side of the second optical member 23, and separates the light emitted from the second optical member 23 into the green light beam GLs1 having the green wavelength band and the red light beam RLs5 having the red wavelength band.

According to this configuration, it is possible to emit the blue light beam BLs, the green light beam GLs, the green light beam GLs1, and the red light beam RLs5 from the light source device 2.

Further, in the case of the present embodiment, since the fifth retardation element 32 is disposed between the second optical member 23 and the second color separation element 33, it is possible to convert the light as the P-polarization component emitted from the second optical member 23 into the light as the S-polarization component. Thus, it is possible to convert the green light beam GLs1 and the red light beam RLs5 emitted from the second color separation element 33 into the light as the S-polarization component, and it is possible to uniform all of the blue light beam BLs, the green light beam GLs, the green light beam GLs1, and the red light beam RLs5 emitted from the light source device 2 into the light as the S-polarization component.

Further, in the case of the present embodiment, since the light source device 2 is provided with the first light collection element 25 for converging the blue light beam BLs toward the diffusion device 26, it is possible to efficiently converge the blue light beam BLc1 emitted from the second retardation element 24 on the diffusion device 26 with the first light collection element 25, and at the same time, it is possible to substantially collimate the blue light beam BLc2 emitted from the diffusion device 26. Thus, it is possible to suppress the loss of the blue light beam BLs to increase the use efficiency of the blue light beam BLs.

Further, in the case of the present embodiment, since the light source device 2 is provided with the second light collection element 27 for converging the blue light beam BLp toward the wavelength conversion element 28, it is possible to efficiently converge the blue light beam BLp emitted from the second optical member 23 on the wavelength conversion element 28 with the second light collection element 27, and at the same time, it is possible to collimate the yellow light beam YL emitted from the wavelength conversion element 28. Thus, it is possible to suppress the loss of the blue light beam BLp and the yellow light beam YL to increase the use efficiency of the blue light beam BLp and the yellow light beam YL.

Further, in the light source device 2 according to the present embodiment, there is adopted the configuration further provided with the first mirror 141, the second mirror 142, and the third mirror 143, wherein the first mirror 141 is disposed at the +Y direction side of the first optical member 22 and the second optical member 23, the second mirror 142 is disposed so as to be opposed to the first mirror 141, and is disposed at the −Y direction side of the first optical member 22 and the second optical member 23, and the third mirror 143 is disposed so as to cross the first transparent substrate 220 and the second transparent substrate 230 to couple the end part 141a at the +X direction side of the first mirror 141 and the end part 142a at the +X direction side of the second mirror 142 to each other.

As described above, although the blue light beam BLc2 emitted from the diffusion device 26 is substantially collimated by the first light collection element 25, some components thereof enter the first optical member 22 in a diverging state. Similarly, although the yellow light beam YL emitted from the wavelength conversion element 28 is substantially collimated by the second light collection element 27, some components thereof enter the second optical member 23 in a diverging state.

In contrast, in the case of the present embodiment, since there is provided the light tunnel 40 for holding the both sides of the first optical member 22 and the second optical member 23 in the Y direction, it is possible to take the light spreading in the Y direction in the first optical member 22 or the second optical member 23 by reflecting the light with the first mirror 141 and the second mirror 142. Further, it is possible to take the light spreading in the +X direction in the second optical member 23 by reflecting the light with the third mirror 143. Further, even when some components of the first light beam BL having been emitted from the first light source section 21A spread in the Y direction, by reflecting the components with the first mirror 141 and the second mirror 142, it is possible to take the components in the first optical member 22.

Thus, it is possible to efficiently take in the light which is emitted to the first optical member 22 of the plate type and the second optical member 23 of the plate type from the first light source section 21A, the diffusion device 26, and the wavelength conversion element 28.

Further, in the case of the present embodiment, since the projector 1 is provided with the homogenization device 4 located between the light source device 2 and the light modulation device 6, it is possible to substantially homogenously irradiate the light modulation device 6 with the blue light beam BLs, the green light beam GLs, the green light beam GLs1, and the red light beam RLs5 emitted from the light source device 2. Thus, it is possible to suppress the color unevenness and the luminance unevenness in the projection image.

Further, in the case of the present embodiment, since the light modulation device 6 is provided with the microlens array 62 having the plurality of microlenses 621 corresponding to the plurality of pixels PX, it is possible to make the four colored light beams entering the light modulation device 6 enter the corresponding four sub-pixels SX of the liquid crystal panel 61 using the microlenses 621. Thus, it is possible to make the colored light beams emitted from the light source device 2 efficiently enter the respective sub-pixels SX, and thus, it is possible to increase the use efficiency of the colored light beams.

Second Embodiment

A second embodiment of the present disclosure will hereinafter be described using FIG. 11 and FIG. 12.

A light source device according to the second embodiment is substantially the same in basic configuration as in the first embodiment, but is different in arrangement places of the second light source section, the first optical element, and the second optical element from that in the first embodiment. Therefore, the description of the whole of the light source device will be omitted.

Figure 11:
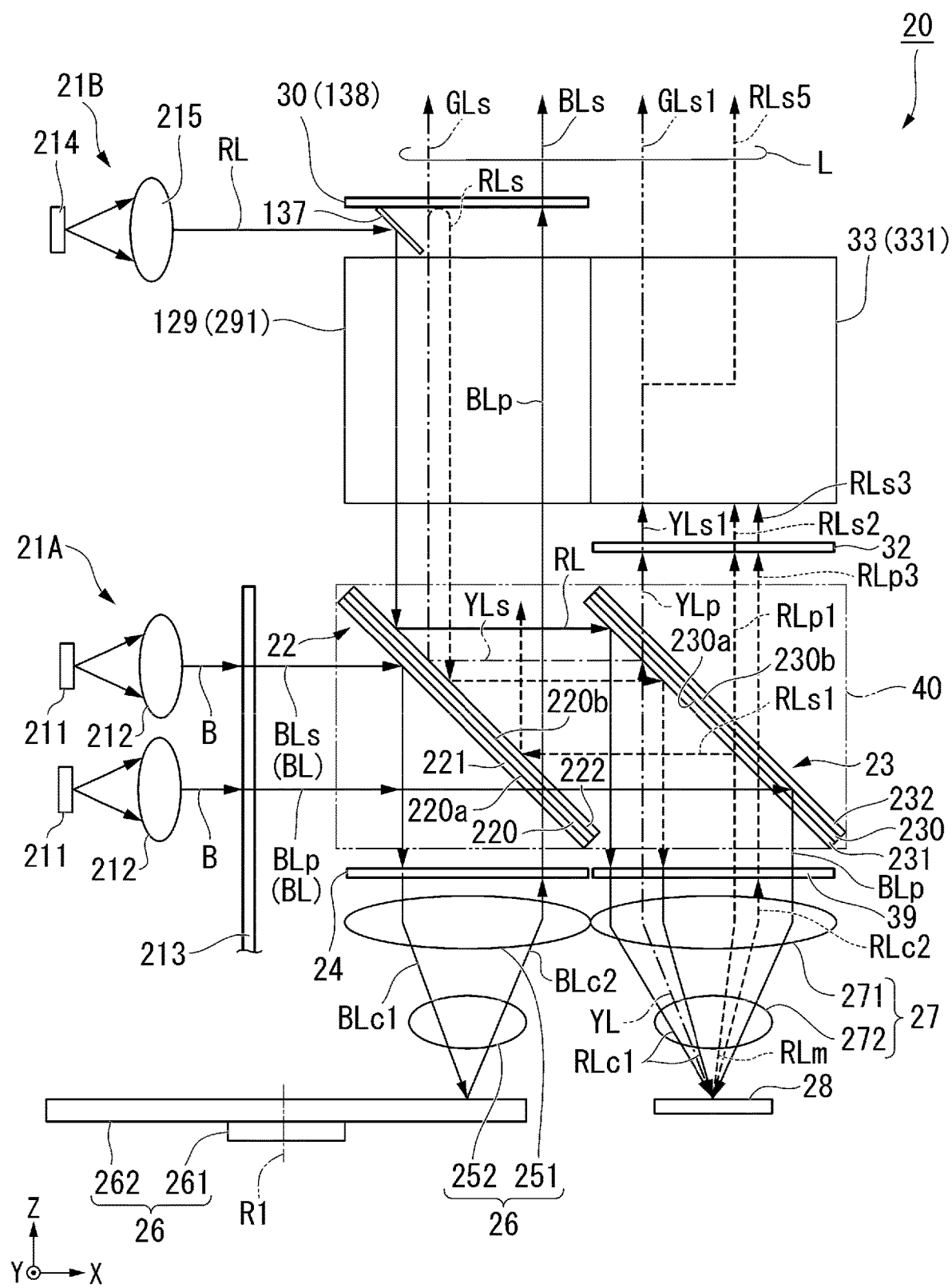
FIG. 11 is a plan view in an essential part of a light source device according to a second embodiment viewed from the +Y direction.

FIG. 11 is a plan view in an essential part of the light source device 20 according to the second embodiment viewed from the +Y direction. In FIG. 11, the constituents common to the drawing used in the first embodiment are denoted by the same reference symbols, and the description thereof will be omitted.

Figure 12:
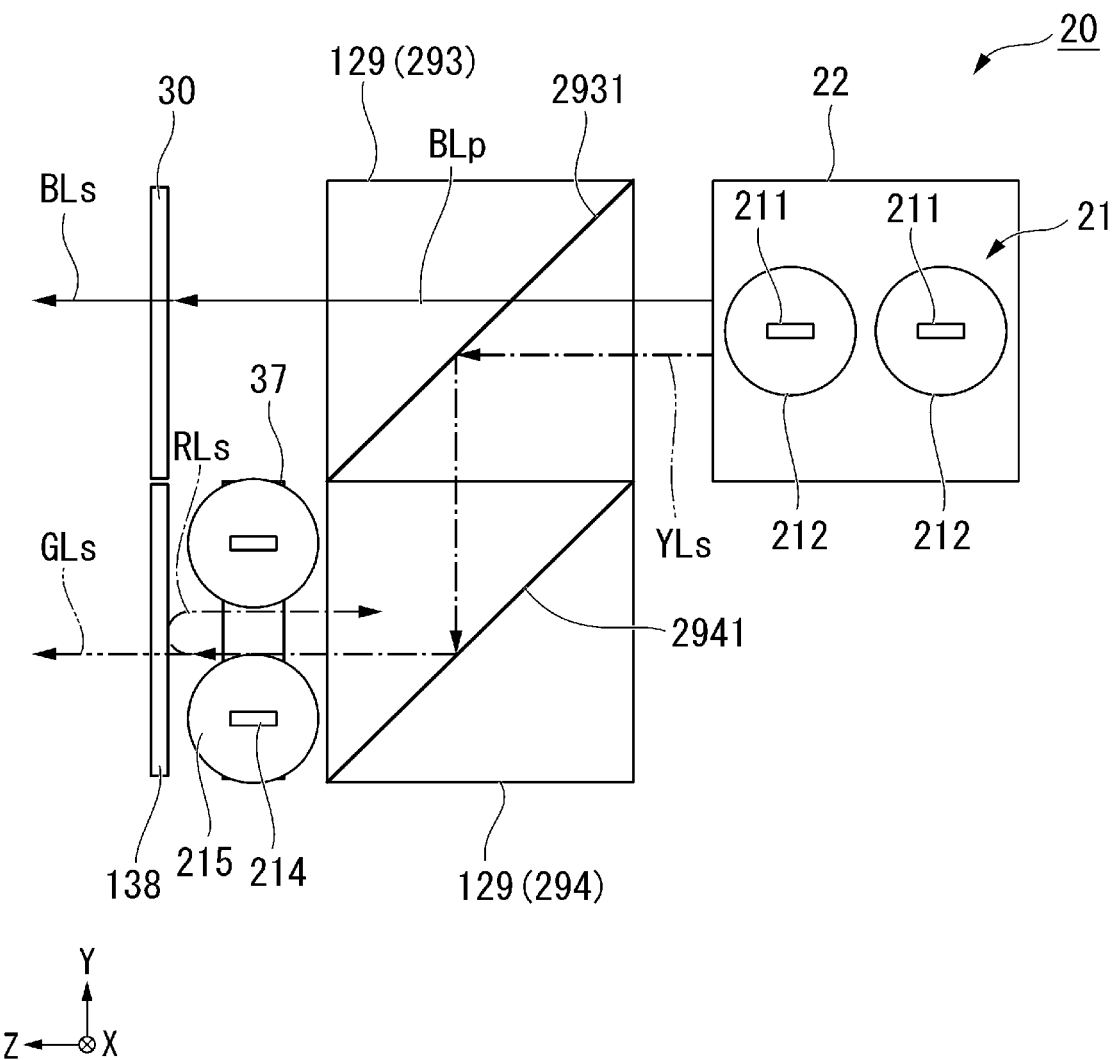
FIG. 12 is a side view of the light source device according to the second embodiment viewed from the −X direction.

FIG. 12 is a side view of the light source device 20 viewed from the −X direction. FIG. 12 is a diagram corresponding to FIG. 7 in the first embodiment.

As shown in FIG. 11 and FIG. 12, the light source device 20 according to the present embodiment has the first light source section 21A, the second light source section 21B, the first optical member 22, the second optical member 23, the first retardation element 39, the second retardation element 24, the first light collection element 25, the diffusion device 26, the second light collection element 27, the wavelength conversion element 28, a first optical element 137, a second optical element 138, a first color separation element 129, the fourth retardation element 30, the fifth retardation element 32, the second color separation element 33, and the light tunnel 40.

In the light source device 20 according to the present embodiment, the first optical element 137 and the second optical element 138 are each disposed at the +Z direction side of the first color separation element 129. The first optical element 137 is disposed at the −Z direction side of the second optical element 138. Specifically, the first optical element 137 and the second optical element 138 are disposed at the +Z direction side of a reflecting prism 294 in the first color separation element 129. The second light source section 21B is disposed so as to make the red light beam RL enter the first optical element 137 located between the second optical element 138 and the reflecting prism 294.

The first optical element 137 in the present embodiment is formed of a dichroic mirror having a characteristic of transmitting the green light beam, and reflecting the red light beam.

The first color separation element 129 in the present embodiment separates the light emitted toward the +Z direction from the first optical member 22 into the blue light beam BLp and the yellow light beam YLs. A dichroic prism 293 of the first color separation element 129 in the present embodiment reflects the yellow light beam YLs out of the light which enters the dichroic prism 293 from the first optical member 22 with a color separation layer 2931 toward the −Y direction.

The yellow light beam YLs reflected by the color separation layer 2931 enters the reflecting prism 294. The yellow light beam YLs which enters a reflecting layer 2941 of the reflecting prism. 294 in the −Y direction from the dichroic prism 293 is reflected toward the +Z direction by the reflecting layer 2941. The yellow light beam YLs reflected by the reflecting layer 2941 is emitted from the reflecting prism 294 toward the +Z direction.

The yellow light beam YLs emitted toward the +Z direction from the reflecting prism 294 enters the second optical element 138. The second optical element 138 in the present embodiment is formed of a dichroic mirror having a characteristic of transmitting the green light beam, and reflecting the red light beam. The second optical element 138 separates the yellow light beam YLs which enters the second optical element 138 along the +Z direction from the reflecting prism 294 into the green light beam GLs and the red light beam RLs. Specifically, the second optical element 138 transmits the green light beam GLs included in the yellow light beam YLs, and at the same time, reflects the red light beam RLs included in the yellow light beam YLs. A component which fails to enter the first optical element 137 out of the red light beam RLs having been reflected by the second optical element 138 is transmitted through the first color separation element 129 via the reflecting prism 294 and the dichroic prism 293 in this order, and is then emitted toward the −Z direction to enter the first optical member 22.

The red light beam RLs separated from the yellow light beam YLs in the second optical element 138 is reflected by each of the first optical layer 222 and the second polarization split layer 231 to thereby enter the wavelength conversion element 28 similarly to the first embodiment.

Further, the red light beam RL which has been reflected by the first optical element 137 to enter the reflecting prism 294 is reflected by each of the first optical layer 222 and the second polarization split layer 231 to thereby enter the wavelength conversion element 28 similarly to the red light beam RLs. It should be noted that a part of the red light beam RL and the red light beam RLs having entered the wavelength conversion element 28 is emitted to the outside as the red light beam RLs5 similarly to the first embodiment.

Advantages of Second Embodiment

Also in the present embodiment, it is possible to obtain substantially the same advantages as in the first embodiment such as the advantage that it is possible to realize the light source device 20 capable of emitting the plurality of colored light beams made uniform in polarization direction without using the polarization conversion element narrow in pitch, and the advantage that it is possible to achieve the reduction in size of the light source device 20 and the projector 1.

Further, also in the light source device 20 according to the second embodiment, a part of the red light beam RL emitted from the second light source section 21B and the red light beam RLs separated from the yellow light beam YLs by the second optical element 138 can be taken out to the outside as the red light beam RLs5. Thus, it is possible to increase the red light which enters the pixel PX, and therefore, it is possible to further enhance the color reproducibility in the red light of the projection image similarly to the first embodiment.

Third Embodiment

A third embodiment of the present disclosure will hereinafter be described using FIG. 13 and FIG. 14.

A light source device according to the third embodiment is substantially the same in basic configuration as in the first embodiment, but is different in arrangement places of the second light source section, the first optical element, and the second optical element from that in the first embodiment. Therefore, the description of the whole of the light source device will be omitted.

Figure 13:
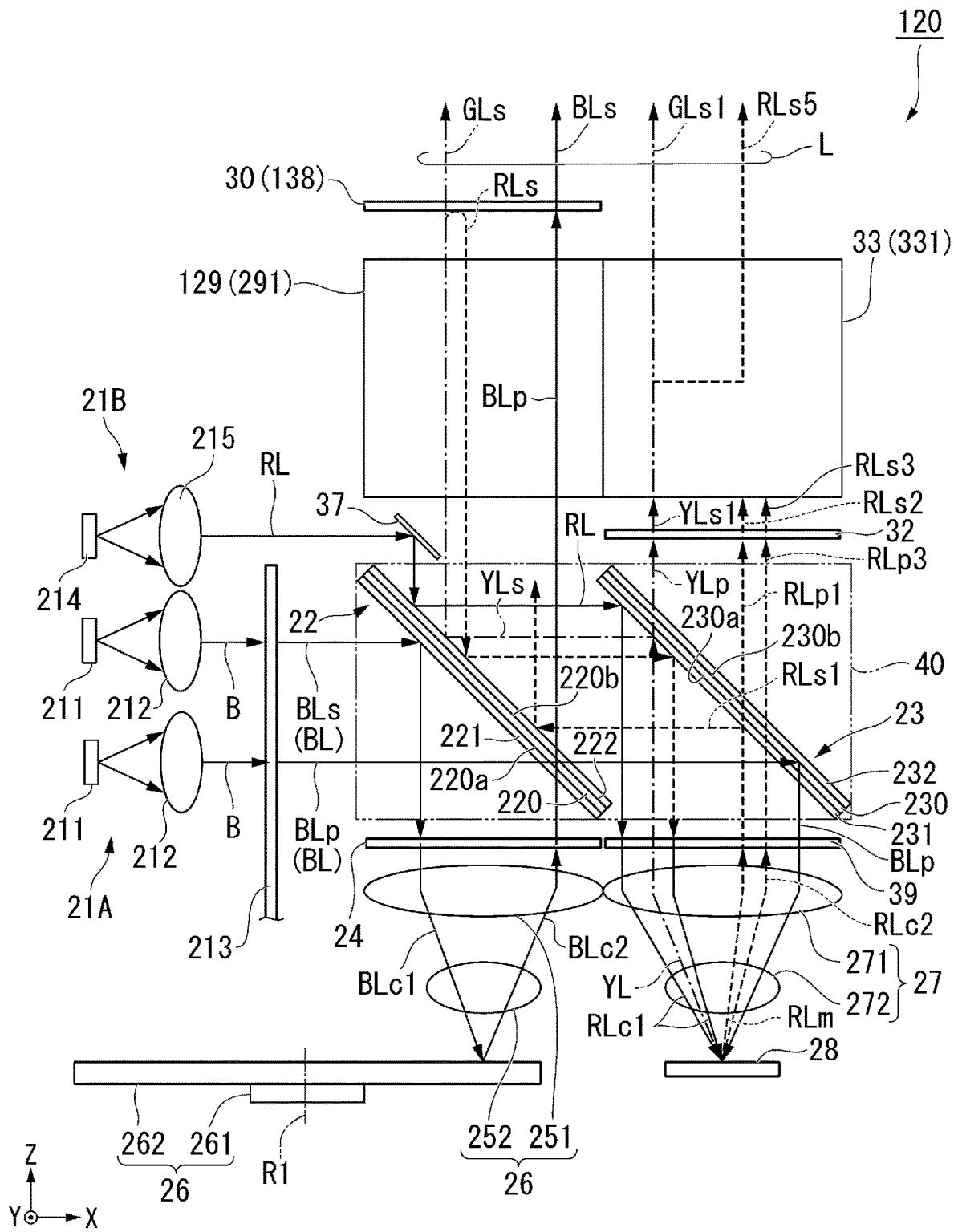
FIG. 13 is a plan view in an essential part of a light source device according to a third embodiment viewed from the +Y direction.

FIG. 13 is a plan view in an essential part of the light source device 120 according to the third embodiment viewed from the +Y direction. In FIG. 13, the constituents common to the drawing used in the first embodiment are denoted by the same reference symbols, and the description thereof will be omitted.

Figure 14:
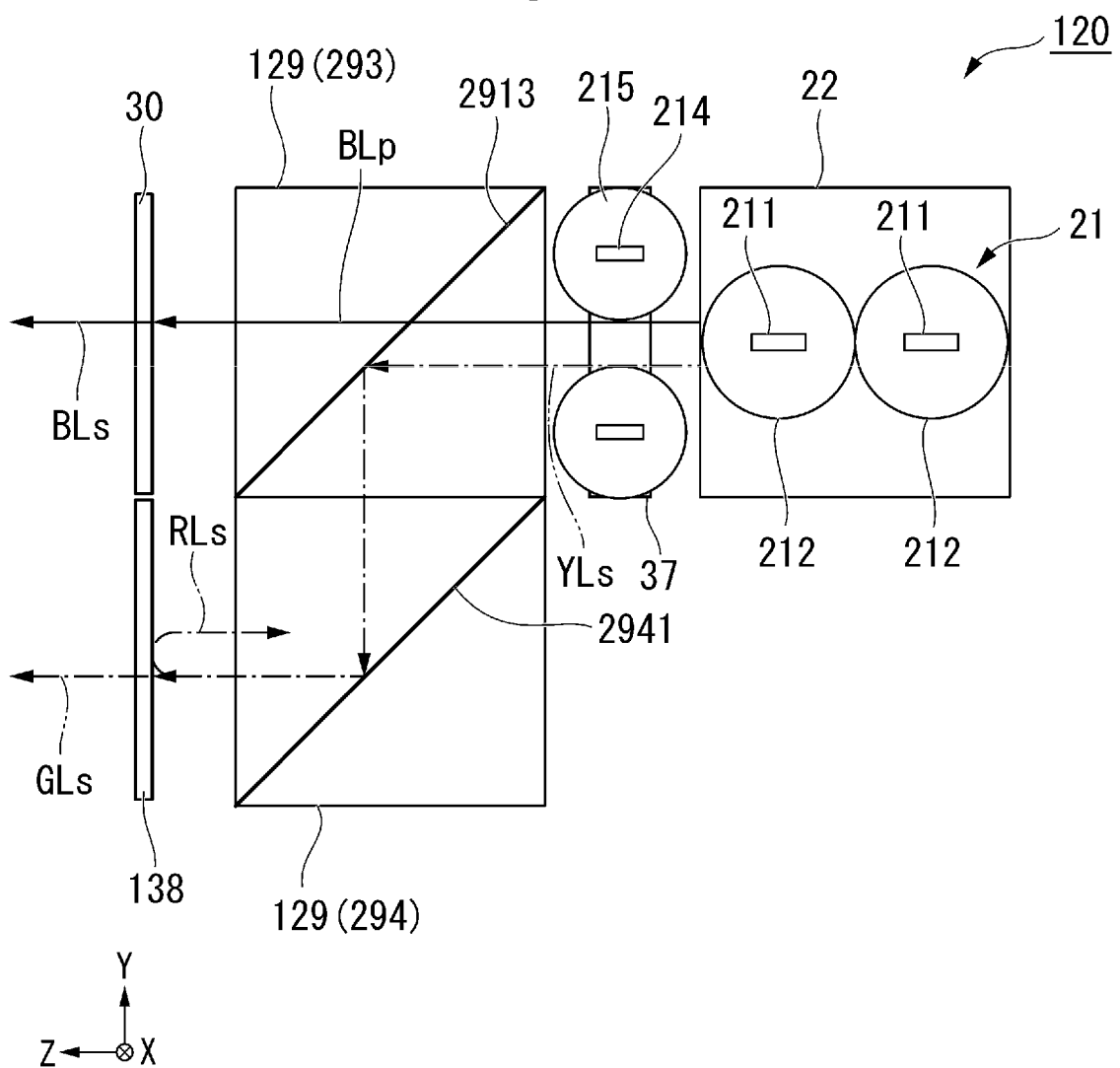
FIG. 14 is a side view of the light source device according to the third embodiment viewed from the −X direction.

FIG. 14 is a side view of the light source device 120 viewed from the −X direction. FIG. 14 is a diagram corresponding to FIG. 7 in the first embodiment.

As shown in FIG. 13 and FIG. 14, the light source device 120 according to the present embodiment has the first light source section 21A, the second light source section 21B, the first optical member 22, the second optical member 23, the first retardation element 39, the second retardation element 24, the first light collection element 25, the diffusion device 26, the second light collection element 27, the wavelength conversion element 28, the first optical element 37, the second optical element 138, the first color separation element 129, the fourth retardation element 30, the fifth retardation element 32, the second color separation element 33, and the light tunnel 40.

In the light source device 120 according to the present embodiment, the first optical element 37 is disposed at the −Z direction side of the first color separation element 129, and the second optical element 138 is disposed at the +Z direction side of the first color separation element 129. In other words, in the light source device 120 according to the present embodiment, there is provided the second optical element 138 in the light source device 20 according to the second embodiment instead of the second optical element 38 in the light source device 2 according to the first embodiment.

In the present embodiment, the red light beam RLs having been reflected by the second optical element 138 is transmitted through the first color separation element 129 via the reflecting prism 294 and the dichroic prism 293 in this order, and is then emitted toward the −Z direction. A component which fails to enter the first optical element 37 out of the red light beam RLs having been emitted toward the −Z direction from the first color separation element 129 enters the first optical member 22.

The red light beam RLs enters the first optical member 22 together with the red light beam RL having been reflected by the first optical element 37. The red light beam RL and the red light beam RLs are reflected by the first optical member 22 toward the +X direction, and the red light beam RL and the red light beam RLs which are reflected by the first optical member 22 and then enter the second optical member 23 along the +X direction are reflected by the second optical member 23 toward the −Z direction. The red light beam RL and the red light beam RLs reflected by the second optical member 23 enter the wavelength conversion element 28. A part of the red light beam RL and the red light beam RLs having entered the wavelength conversion element 28 is emitted to the outside as the red light beam RLs5 similarly to the first embodiment and the second embodiment.

Advantages of Third Embodiment

Also in the light source device 120 according to the present embodiment, it is possible to obtain substantially the same advantages as in the first embodiment such as the advantage that it is possible to realize the light source device 120 capable of emitting the plurality of colored light beams made uniform in polarization direction without using the polarization conversion element narrow in pitch, and the advantage that it is possible to achieve the reduction in size of the light source device 120 and the projector 1.

Also in the light source device 120 according to the third embodiment, a part of the red light beam RL emitted from the second light source section 21B and the red light beam RLs separated from the yellow light beam YLs by the second optical element 138 can be taken out to the outside as the red light beam RLs5. Thus, it is possible to increase the red light which enters the pixel PX, and therefore, it is possible to further enhance the color reproducibility in the red light of the projection image similarly to the embodiments described above.

It should be noted that the scope of the present disclosure is not limited to the embodiments described above, but a variety of modifications can be provided thereto within the scope or the spirit of the present disclosure.

For example, although there is cited when forming both of the first optical member 22 and the second optical member 23 of the plate type polarization split element as an example in the embodiments described above, the first optical member 22 and the second optical member 23 can be formed of a prism type polarization split element in which two members each shaped like a substantially isosceles right triangular prism are combined with each other to form a substantially rectangular solid shape provided with an optical film formed on the interface between the two members. When using the prism type polarization split element as the first optical member 22 and the second optical member 23, the light tunnel 40 becomes unnecessary. Further, it is possible to form one of the first optical member 22 and the second optical member 23 using the prism type, and form the other using the plate type.

For example, in the embodiments described above, the first polarization split layer and the first optical layer are disposed on two surfaces of a single light transmissive substrate. Instead of this configuration, it is possible for the first polarization split layer and the first optical layer to be provided to respective light transmissive substrates different from each other. For example, it is possible to adopt a configuration in which the first polarization split layer is disposed on a first surface of a first light transmissive substrate, an antireflection layer is disposed on a second surface different from the first surface of the first light transmissive substrate, the first optical layer is disposed on a third surface of a second light transmissive substrate, an antireflection layer is disposed on a fourth surface different from the third surface of the second light transmissive substrate, and the first polarization split layer and the first optical layer are disposed so as to be opposed to each other. Similarly, the second polarization split layer and the second optical layer can be provided to respective light transmissive substrates different from each other.

The light source devices 2, 20, and 120 according to the embodiments described above are each provided with the first light collection element 25 and the second light collection element 27. However, this configuration is not a limitation, but at least one of the first light collection element 25 and the second light collection element 27 is not required to be disposed.

The first light source section 21A in each of the embodiments described above emits the blue light beams BLs, BLp in the +X direction. However, this is not a limitation, and it is also possible to adopt a configuration in which the first light source section 21A emits the blue light beams BLs, BLp in a direction crossing the +X direction, and the blue light beams BLs, BLp are reflected using, for example, a reflecting member, and are then made to enter the first optical member 22 in the +X direction.

The projector according to each of the embodiments described above is provided with the homogenization device 4 having the first multi-lens 41, the second multi-lens 42, and the superimposing lens 43. It is possible to dispose a homogenization device having other configurations instead of this configuration, or it is not required to dispose the homogenization device 4.

The light source devices 2, 20, and 120 according to the embodiments described above each emit the colored light beams from the four exit positions, respectively, and the liquid crystal panel 61 constituting the light modulation device 6 has the four sub-pixels SX in each of the pixels PX. Instead of this configuration, it is possible to adopt a configuration in which the light source devices 2, 20, and 120 each emit three colored light beams, and the liquid crystal panel has three sub-pixels in each pixel. In this case, for example, in the light source devices according to the embodiments described above, a total reflection member can be disposed in the light path of the green light beam GLs.

The light source devices 2, 20, and 120 according to the embodiments described above each emit the blue light beam BLs, the green light beam GLs, the green light beam GLs1, and the red light beam RLs5 which are each S-polarized light, and are spatially separated from each other. Instead of these configurations, the polarization state of the colored light beams emitted by the light source device can be another polarization state. For example, it is possible for the light source device to have a configuration of emitting a plurality of colored light beams which are each P-polarized light, and are spatially separated from each other.

Besides the above, the specific descriptions of the shape, the number, the arrangement, the material, and so on of the constituents of the light source device and the projector are not limited to those of the embodiments described above, but can arbitrarily be modified. Further, although in the embodiments described above, there is described the example of installing the light source device according to the present disclosure in the projector, the example is not a limitation. The light source device according to an aspect of the present disclosure can also be applied to lighting equipment, a headlight of a vehicle, and so on.

A light source device according to an aspect of the present disclosure may have the following configuration.

The light source device according to an aspect of the present disclosure includes a first light source section configured to emit a first light beam which has a first wavelength band and includes light polarized in a first polarization direction and light polarized in a second polarization direction different from the first polarization direction, a first polarization split element configured to transmit the first light beam entering the first polarization split element from the first light source section along a first direction and polarized in the first polarization direction toward the first direction, and configured to reflect the first light beam polarized in the second polarization direction toward a second direction crossing the first direction, a second polarization split element disposed at the first direction side of the first polarization split element, and configured to reflect the first light beam which enters the second polarization split element along the first direction from the first polarization split element, and is polarized in the first polarization direction toward the second direction, a diffusion element configured to diffuse the first light beam entering the diffusion element along the second direction from the first polarization split element, and configured to emit the first light beam diffused toward a third direction as an opposite direction to the second direction, a wavelength conversion element disposed at the second direction side of the second polarization split element, configured to perform wavelength conversion on the first light beam which enters the wavelength conversion element along the second direction from the second polarization split element, and is polarized in the first polarization direction, and configured to emit a second light beam having a second wavelength band different from the first wavelength band toward the third direction, a second light source section configured to emit a third light beam having a third wavelength band different from the first wavelength band and the second wavelength band, a first optical element configured to reflect the third light beam, and a second optical element configured to separate the second light beam into a fourth light beam having a fourth wavelength band different from the first wavelength band, the second wavelength band, and the third wavelength band, and a fifth light beam having the third wavelength band, wherein the second light beam enters the second polarization split element along the third direction, the second polarization split element transmits the second light beam polarized in the first polarization direction toward the third direction, and reflects the second light beam polarized in the second polarization direction toward a fourth direction as an opposite direction to the first direction, the first polarization split element transmits the first light beam which is emitted along the third direction from the diffusion element, and reflects the second light beam which enters the first polarization split element along the fourth direction from the second polarization split element, and is polarized in the second polarization direction toward the third direction, and the third light beam reflected by the first optical element enters the wavelength conversion element together with the fifth light beam separated by the second optical element.

In the light source device according to the aspect of the present disclosure, there may be adopted a configuration further including a first retardation element which is disposed on a light path of the third light beam between the second polarization split element and the wavelength conversion element, and is configured to provide a phase difference as much as ¼ of the third wavelength band to the third light beam.

In the light source device according to the aspect of the present disclosure, there may be adopted a configuration further including a second retardation element which is disposed between the first polarization split element and the diffusion element, and which the first light beam polarized in the second polarization direction enters along the second direction from the first polarization split element.

In the light source device according to the aspect of the present disclosure, there may be adopted a configuration in which the first light source section includes a light emitting element configured to emit light in the first wavelength band, and a third retardation element which the light emitted from the light emitting element enters, and which emits the first light beam.

In the light source device according to the aspect of the present disclosure, there may be adopted a configuration in which the third retardation element is made rotatable around a rotational axis along a proceeding direction of light entering the third retardation element.

In the light source device according to the aspect of the present disclosure, there may be adopted a configuration further including a first mirror disposed at a fifth direction side of the first polarization split element and the second polarization split element, the fifth direction crossing the first direction, the second direction, the third direction, and the fourth direction, a second mirror disposed so as to be opposed to the first mirror, and disposed at a sixth direction side of the first polarization split element and the second polarization split element, the sixth direction being an opposite direction to the fifth direction, and a third mirror which is disposed so as to cross the first polarization split element and the second polarization split element, and couples an end part in the first direction of the first mirror and an end part in the first direction of the second mirror to each other.

In the light source device according to the aspect of the present disclosure, there may be adopted a configuration in which the second polarization split element separates the third light beam and the fifth light beam which enter the second polarization split element along the third direction from the wavelength conversion element into light polarized in the first polarization direction and light polarized in the second polarization direction, and transmits the light polarized in the first polarization direction toward the third direction.

In the light source device according to the aspect of the present disclosure, there may be adopted a configuration further including a first color separation element disposed at the third direction side of the first polarization split element, and configured to separate light emitted from the first polarization split element into a sixth light beam having the first wavelength band and a seventh light beam having the fourth wavelength band, and a second color separation element disposed at the third direction side of the second polarization split element, and configured to separate light emitted from the second polarization split element into an eighth light beam having the fourth wavelength band and a ninth light beam having the third wavelength band.

In the light source device according to the aspect of the present disclosure, there may be adopted a configuration in which the first optical element is disposed at the second direction side of the second optical element, and disposed at the third direction side of the first polarization split element, and the second optical element is disposed at the second direction side of the first color separation element.

In the light source device according to the aspect of the present disclosure, there may be adopted a configuration in which the first polarization split element reflects the third light beam which is reflected by the first optical element and the fifth light beam which is separated by the second optical element toward the first direction, the second polarization split element reflects the third light beam and the fifth light beam which are reflected by the first polarization split element to enter the second polarization split element along the first direction toward the second direction, and the third light beam and the fifth light beam reflected by the second polarization split element enter the wavelength conversion element.

In the light source device according to the aspect of the present disclosure, there may be adopted a configuration in which the first optical element is disposed at the second direction side of the second optical element, and the first optical element and the second optical element are each disposed at the third direction side of the first color separation element.

In the light source device according to the aspect of the present disclosure, there may be adopted a configuration in which the third light beam which is reflected by the first optical element and the fifth light beam which is separated by the second optical element are transmitted through the first color separation element to enter the first polarization split element, the first polarization split element reflects the third light beam and the fifth light beam which enters the first polarization split element along the second direction from the first color separation element toward the first direction, the second polarization split element reflects the third light beam and the fifth light beam which are reflected by the first polarization split element to enter the second polarization split element along the first direction toward the second direction, and the third light beam and the fifth light beam reflected by the second polarization split element enter the wavelength conversion element.

In the light source device according to the aspect of the present disclosure, there may be adopted a configuration in which the first optical element is disposed at the second direction side of the first color separation element, and the second optical element is disposed at the third direction side of the first color separation element.

In the light source device according to the aspect of the present disclosure, there may be adopted a configuration in which the fifth light beam which is separated by the second optical element and is transmitted through the first color separation element enters the first polarization split element together with the third light beam which is reflected by the first optical element, the first polarization split element reflects the third light beam and the fifth light beam toward the first direction, the second polarization split element reflects the third light beam and the fifth light beam which are reflected by the first polarization split element to enter the second polarization split element along the first direction toward the second direction, and the third light beam and the fifth light beam reflected by the second polarization split element enter the wavelength conversion element.

A projector according to another aspect of the present disclosure may have the following configuration.

The projector according to the aspect of the present disclosure includes the light source device according to the aspect of the present disclosure, a light modulation device configured to modulate light from the light source device in accordance with image information, and a projection optical device configured to project the light modulated by the light modulation device.

In the projector according to the above aspect of the present disclosure, there may be adopted a configuration further including a homogenization device disposed between the light source device and the light modulation device, wherein the homogenization device includes a pair of multi-lenses configured to divide the light entering the pair of multi-lenses from the light source device into a plurality of partial light beams, and a superimposing lens configured to superimpose the plurality of partial light beams entering the superimposing lens from the pair of multi-lenses on the light modulation device.

In the projector according to the above aspect of the present disclosure, there may be adopted a configuration in which the light modulation device includes a liquid crystal panel having a plurality of pixels, and a microlens array which is disposed at a light incident side of the liquid crystal panel, and has a plurality of microlenses corresponding to the plurality of pixels, the pixels each include a first sub-pixel, a second sub-pixel, a third sub-pixel, and a fourth sub-pixel, and the microlens makes the sixth light beam enter the first sub-pixel, makes the seventh light beam enter the second sub-pixel, makes the eighth light beam enter the third sub-pixel, and makes the ninth light beam enter the fourth sub-pixel.

What is claimed is:

1. A light source device comprising:
a first light source section configured to emit a first light beam which has a first wavelength band and includes light polarized in a first polarization direction and light polarized in a second polarization direction different from the first polarization direction;
a first polarization split element configured to transmit the first light beam entering the first polarization split element from the first light source section along a first direction and polarized in the first polarization direction toward the first direction, and configured to reflect the first light beam polarized in the second polarization direction toward a second direction crossing the first direction;
a second polarization split element disposed at the first direction side of the first polarization split element, and configured to reflect the first light beam which enters the second polarization split element along the first direction from the first polarization split element, and is polarized in the first polarization direction toward the second direction;
a diffusion element configured to diffuse the first light beam entering the diffusion element along the second direction from the first polarization split element, and configured to emit the first light beam diffused toward a third direction as an opposite direction to the second direction;
a wavelength conversion element disposed at the second direction side of the second polarization split element, configured to perform wavelength conversion on the first light beam which enters the wavelength conversion element along the second direction from the second polarization split element, and is polarized in the first polarization direction, and configured to emit a second light beam having a second wavelength band different from the first wavelength band toward the third direction;
a second light source section configured to emit a third light beam having a third wavelength band different from the first wavelength band and the second wavelength band;
a first optical element configured to reflect the third light beam; and
a second optical element configured to separate the second light beam into a fourth light beam having a fourth wavelength band different from the first wavelength band, the second wavelength band, and the third wavelength band, and a fifth light beam having the third wavelength band, wherein the second light beam enters the second polarization split element along the third direction, the second polarization split element transmits the second light beam polarized in the first polarization direction toward the third direction, and reflects the second light beam polarized in the second polarization direction toward a fourth direction as an opposite direction to the first direction, the first polarization split element transmits the first light beam which is emitted along the third direction from the diffusion element, and reflects the second light beam which enters the first polarization split element along the fourth direction from the second polarization split element, and is polarized in the second polarization direction toward the third direction, and the third light beam reflected by the first optical element enters the wavelength conversion element together with the fifth light beam separated by the second optical element.

2. The light source device according to claim 1, further comprising:
a first retardation element which is disposed on a light path of the third light beam between the second polarization split element and the wavelength conversion element, and is configured to provide a phase difference as much as ¼ of the third wavelength band to the third light beam.

3. The light source device according to claim 1, further comprising:
a second retardation element which is disposed between the first polarization split element and the diffusion element, and which the first light beam polarized in the second polarization direction enters along the second direction from the first polarization split element.

4. The light source device according to claim 1, wherein the first light source section includes a light emitting element configured to emit light in the first wavelength band, and a third retardation element which the light emitted from the light emitting element enters, and which emits the first light beam.

5. The light source device according to claim 4, wherein the third retardation element is made rotatable around a rotational axis along a proceeding direction of light entering the third retardation element.

6. The light source device according to claim 1, further comprising:
a first mirror disposed at a fifth direction side of the first polarization split element and the second polarization split element, the fifth direction crossing the first direction, the second direction, the third direction, and the fourth direction;
a second mirror disposed so as to be opposed to the first mirror, and disposed at a sixth direction side of the first polarization split element and the second polarization split element, the sixth direction being an opposite direction to the fifth direction; and
a third mirror which is disposed so as to cross the first polarization split element and the second polarization split element, and couples an end part in the first direction of the first mirror and an end part in the first direction of the second mirror to each other.

7. The light source device according to claim 1, wherein the second polarization split element separates the third light beam and the fifth light beam which enter the second polarization split element along the third direction from the wavelength conversion element into light polarized in the first polarization direction and light polarized in the second polarization direction, and transmits the light polarized in the first polarization direction toward the third direction.

8. The light source device according to claim 1, further comprising:
a first color separation element disposed at the third direction side of the first polarization split element, and configured to separate light emitted from the first polarization split element into a sixth light beam having the first wavelength band and a seventh light beam having the fourth wavelength band; and
a second color separation element disposed at the third direction side of the second polarization split element, and configured to separate light emitted from the second polarization split element into an eighth light beam having the fourth wavelength band and a ninth light beam having the third wavelength band.

9. The light source device according to claim 8, wherein
the first optical element is disposed at the second direction side of the second optical element, and disposed at the third direction side of the first polarization split element, and
the second optical element is disposed at the second direction side of the first color separation element.

10. The light source device according to claim 9, wherein
the first polarization split element reflects the third light beam which is reflected by the first optical element and the fifth light beam which is separated by the second optical element toward the first direction,
the second polarization split element reflects the third light beam and the fifth light beam which are reflected by the first polarization split element to enter the second polarization split element along the first direction toward the second direction, and
the third light beam and the fifth light beam reflected by the second polarization split element enter the wavelength conversion element.

11. The light source device according to claim 8, wherein
the first optical element is disposed at the second direction side of the second optical element, and
the first optical element and the second optical element are each disposed at the third direction side of the first color separation element.

12. The light source device according to claim 11, wherein
the third light beam which is reflected by the first optical element and the fifth light beam which is separated by the second optical element are transmitted through the first color separation element to enter the first polarization split element,
the first polarization split element reflects the third light beam and the fifth light beam which enters the first polarization split element along the second direction from the first color separation element toward the first direction,
the second polarization split element reflects the third light beam and the fifth light beam which are reflected by the first polarization split element to enter the second polarization split element along the first direction toward the second direction, and
the third light beam and the fifth light beam reflected by the second polarization split element enter the wavelength conversion element.

13. The light source device according to claim 8, wherein
the first optical element is disposed at the second direction side of the first color separation element, and
the second optical element is disposed at the third direction side of the first color separation element.

14. The light source device according to claim 13, wherein
the fifth light beam which is separated by the second optical element and is transmitted through the first color separation element enters the first polarization split element together with the third light beam which is reflected by the first optical element,
the first polarization split element reflects the third light beam and the fifth light beam toward the first direction,
the second polarization split element reflects the third light beam and the fifth light beam which are reflected by the first polarization split element to enter the second polarization split element along the first direction toward the second direction, and
the third light beam and the fifth light beam reflected by the second polarization split element enter the wavelength conversion element.

15. A projector comprising:
a light source device according to claim 8;
a light modulation device configured to modulate light from the light source device in accordance with image information; and
a projection optical device configured to project the light modulated by the light modulation device.

16. The projector according to claim 15, further comprising:
a homogenization device disposed between the light source device and the light modulation device, wherein
the homogenization device includes
a pair of multi-lenses configured to divide the light entering the pair of multi-lenses from the light source device into a plurality of partial light beams, and
a superimposing lens configured to superimpose the plurality of partial light beams entering the superimposing lens from the pair of multi-lenses on the light modulation device.

17. The projector according to claim 16, wherein
the light modulation device includes a liquid crystal panel having a plurality of pixels, and a microlens array which is disposed at a light incident side of the liquid crystal panel, and has a plurality of microlenses corresponding to the plurality of pixels,
the pixels each include a first sub-pixel, a second sub-pixel, a third sub-pixel, and a fourth sub-pixel, and
the microlens makes the sixth light beam enter the first sub-pixel, makes the seventh light beam enter the second sub-pixel, makes the eighth light beam enter the third sub-pixel, and makes the ninth light beam enter the fourth sub-pixel.

* * * * *